United States Patent
Chen et al.

(10) Patent No.: US 12,556,110 B2
(45) Date of Patent: Feb. 17, 2026

(54) INVERTER AND INVERTER CONTROL METHOD

(71) Applicant: Huawei Digital Power Technologies Co., Ltd., Shenzhen (CN)

(72) Inventors: Dong Chen, Shanghai (CN); Lei Shi, Shanghai (CN); Yunfeng Liu, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 176 days.

(21) Appl. No.: 18/592,609

(22) Filed: Mar. 1, 2024

(65) Prior Publication Data
US 2024/0305218 A1   Sep. 12, 2024

(30) Foreign Application Priority Data

Mar. 6, 2023  (CN) .......................... 202310244355.4

(51) Int. Cl.
| | |
|---|---|
| *H02M 7/483* | (2007.01) |
| *H02J 9/06* | (2006.01) |
| *H02M 1/12* | (2006.01) |
| *H02M 7/5387* | (2007.01) |

(52) U.S. Cl.
CPC ......... *H02M 7/53871* (2013.01); *H02J 9/062* (2013.01); *H02M 1/126* (2013.01); *H02M 7/483* (2013.01)

(58) Field of Classification Search
CPC .. H02M 7/53871; H02M 1/126; H02M 7/483; H02J 9/062
See application file for complete search history.

(56) References Cited

U.S. PATENT DOCUMENTS

| | | | |
|---|---|---|---|
| 10,516,365 B1 * | 12/2019 | Serban | H02M 7/487 |
| 2021/0316624 A1 | 10/2021 | Stengert | |
| 2022/0337176 A1 | 10/2022 | Chen et al. | |
| 2025/0211132 A1 * | 6/2025 | Li | H02M 7/53871 |

FOREIGN PATENT DOCUMENTS

| | | | | |
|---|---|---|---|---|
| CN | 101976967 B | 1/2013 | | |
| CN | 102761285 B | 8/2015 | | |
| CN | 104796027 B | 8/2017 | | |
| CN | 109672355 A | 4/2019 | | |
| CN | 112187077 A | 1/2021 | | |
| DE | 102020120870 A1 | 2/2022 | | |
| EP | 2479868 A1 | 7/2012 | | |
| JP | 4755504 B2 | 8/2011 | | |
| JP | 4783174 B2 | 9/2011 | | |
| WO | WO-2024131392 A1 * | 6/2024 | | H02M 7/487 |

* cited by examiner

*Primary Examiner* — Adolf D Berhane

(74) *Attorney, Agent, or Firm* — Maier & Maier, PLLC

(57) ABSTRACT

An inverter and an inverter control method. The inverter includes an inverter system and a controller. The inverter system includes an inverter circuit, positive and negative direct current buses, a bus capacitor, and a balancing circuit. The inverter is configured to: when a user connects to an unbalanced load, control the balancing circuit based on different magnitudes of voltage fluctuation generated by the unbalanced load for the bus capacitor, to implement a function of jointly sharing current fluctuation by the bus capacitor and the balancing circuit, and reduce design costs of the bus capacitor and the balancing circuit.

20 Claims, 12 Drawing Sheets

INVERTER AND INVERTER CONTROL METHOD

CROSS-REFERENCE TO RELATED APPLICATION

This application claims priority to Chinese Patent Application No. 202310244355.4, filed on Mar. 6, 2023, which is hereby incorporated by reference in its entirety.

TECHNICAL FIELD

The embodiments relate to the field of power electronics technologies and to an inverter and an inverter control method.

BACKGROUND

An inverter for converting a direct current into an alternating current is widely used in scenarios such as photovoltaic power generation, an uninterruptible power system (UPS), and a battery system. With increasing shortage of traditional fossil energy, new energy represented by solar energy gradually attracts people's attention. An increasing quantity of family users and industrial and commercial users install photovoltaic power generation systems. In addition, to improve economy and stability of the photovoltaic power generation system, a battery management system may be installed, to work with the photovoltaic power generation system. When a local alternating current power grid is faulty, the photovoltaic power generation system and the battery management system may independently support a normal operation of a local alternating current load to some extent. This requires the inverter to have more functions and a higher power supply capability. Generally, the local alternating current load is an unbalanced load. The inverter is used as a key device for converting direct currents of a photovoltaic module and a battery into alternating currents of the local alternating current load. To ensure that the unbalanced load can operate normally when the local alternating current power grid is faulty, a balancing circuit can be designed in an inverter circuit of the inverter, to provide a balancing capability for the local alternating current load. However, due to complexity of the local alternating current load, a design requirement and costs of the balancing circuit are high, and a loss of the balancing circuit is large when the balancing circuit works.

SUMMARY

The embodiments provide an inverter and an inverter control method to reduce design costs and a working loss of an inverter including a balancing circuit.

According to a first aspect, the embodiments provide an inverter system of an inverter. The inverter system includes an inverter circuit, positive and negative direct current buses, a bus capacitor, and a balancing circuit. A positive input end and a negative input end of the inverter circuit are respectively connected to a positive end and a negative end of the bus capacitor, and a positive input end and a negative input end of the balancing circuit are respectively connected to the positive end and the negative end of the bus capacitor. The bus capacitor includes a positive bus capacitor and a negative bus capacitor that are connected in series. One end of the positive bus capacitor and the positive input end of the inverter circuit are electrically connected to the positive direct current bus, and the other end of the positive bus capacitor and a neutral-point input end of the inverter circuit are electrically connected to one end of the negative bus capacitor. The one end of the negative bus capacitor also serves as a neutral-point end of the bus capacitor. The other end of the negative bus capacitor and the negative input end of the inverter circuit are electrically connected to the negative direct current bus. The balancing circuit is a two-level circuit, including a two-level switching transistor bridge arm and a filter inductor. A positive end of the two-level switching transistor bridge arm serves as the positive input end of the balancing circuit and is connected to the positive direct current bus. A negative end of the two-level switching transistor bridge arm serves as the negative input end of the balancing circuit and is connected to the negative direct current bus. A neutral-point end of the two-level switching transistor bridge arm is connected to one end of the filter inductor, and the other end of the filter inductor serves as an output end of the balancing circuit and is connected to the neutral-point input end of the inverter circuit. An output end of the inverter circuit is connected to a local load, and provides an alternating current required for the local load to work. The balancing circuit provides an unbalanced current for the local load, to reduce voltage fluctuation of the bus capacitor and ensure that the local load can work normally. The inverter provided in the embodiments may be applied to a household or industrial and commercial scenario, and has an off-grid operating function. For example, when a local alternating current power grid is faulty, the inverter may independently support a user load in working for a period of time.

With reference to the first aspect, in a first possible implementation, the inverter is a three-phase inverter, and the inverter circuit is a T-type three-phase three-level inverter circuit. The T-type three-phase three-level inverter circuit includes three groups of T-type three-level switching transistor bridge arms and three groups of LC filters. Positive ends of the three groups of T-type three-level switching transistor bridge arms are electrically connected to each other and serve as the positive input ends of the inverter circuit; negative ends of the three groups of T-type three-level switching transistor bridge arms are electrically connected to each other and serve as the negative input ends of the inverter circuit; and neutral-point input ends of the three groups of T-type three-level switching transistor bridge arms are electrically connected to each other and serve as the neutral-point input ends of the inverter circuit. Three output ends of the three groups of LC filters serve as a phase-A output end, a phase-B output end, and a phase-C output end of the inverter circuit respectively. The inverter circuit further includes an N-phase output end and a neutral-point input end. The neutral-point input end of the inverter circuit is electrically connected to the N-phase output end of the inverter circuit, and neutral points of three filter capacitors in the three groups of LC filters may be electrically connected to the N-phase output end of the inverter circuit, or may be electrically disconnected from the N-phase output end of the inverter circuit. For example, when electrical connecting is performed, a part of a common mode current generated by the inverter bridge arm in the inverter circuit may flow back to the neutral-point input end of the inverter circuit through the neutral points of the three filter capacitors in the three groups of LC filters, thereby reducing a common mode current flowing into the user load. When electrical disconnecting is performed, almost all of the common mode current generated by the inverter bridge arm of the inverter circuit flows into the user load, and common mode current adjustment may be implemented on the user load in some special scenarios.

With reference to the first aspect, in a second possible implementation, the inverter is a two-phase inverter, and the inverter circuit is a Heric inverter circuit. The Heric inverter circuit includes two groups of vertical-bridge switching transistor bridge arms, one group of horizontal-bridge switching transistor bridge arms, and two groups of LC filters. Positive ends of the two groups of vertical-bridge switching transistor bridge arms serve as the positive input ends of the inverter circuit, negative ends of the two groups of vertical-bridge switching transistor bridge arms serve as the negative input ends of the inverter circuit, and neutral-point ends of the two groups of vertical-bridge switching transistor bridge arms are connected to each other through the horizontal-bridge switching transistor bridge arms. Two output ends of the two groups of LC filters serve as an L1-phase output end and an L2-phase output end of the inverter circuit respectively. The inverter circuit further includes an N-phase output end and a neutral-point input end. The neutral-point input end of the inverter circuit is connected to the N-phase output end of the inverter circuit, and neutral points of two filter capacitors in the two groups of LC filters may be electrically connected to the N-phase output end of the inverter circuit, or may be electrically disconnected from the N-phase output end of the inverter circuit. For example, when electrical connecting is performed, a part of a common mode current generated by the inverter bridge arm in the inverter circuit may flow back to the neutral-point input end of the inverter circuit through the neutral points of the two filter capacitors in the two groups of LC filters, thereby reducing a common mode current flowing into the user load. When electrical disconnecting is performed, almost all of the common mode current generated by the inverter bridge arm of the inverter circuit flows into the user load, and common mode current adjustment may be implemented on the user load in some special scenarios.

According to a second aspect, the embodiments provide a method for controlling a balancing circuit in an inverter system, where the control method is applied to the first possible implementation of the first aspect or the second possible implementation of the first aspect. The control method provided includes the following.

With reference to the second aspect, in a first possible implementation, the control method includes: first obtaining a current at a neutral-point input end of an inverter circuit; then obtaining a current low-frequency component through a filter; next, performing a multiplication operation on the current low-frequency component and a first preset proportion to obtain a current reference value at an output end of the balancing circuit; and then obtaining, based on the current reference value at the output end of the balancing circuit and a current at the output end of the balancing circuit, a control signal adjusted by a control adjustor, where the control signal is used to control the balancing circuit and then control the current at the output end of the balancing circuit to tend to be consistent with the current reference value at the output end of the balancing circuit. The first preset proportion is less than 100%. After the control method is performed, a first preset proportion part in the low-frequency component of the current at the neutral-point input end of the inverter circuit is provided by the balancing circuit, and a remaining low-frequency component is provided by a bus capacitor. In addition, a high-frequency component of the current at the neutral-point input end of the inverter circuit and a high-frequency component of the current at the output end of the balancing circuit are still borne by the bus capacitor. The control method has at least two functions. In one aspect, the current at the output end of the balancing circuit may reduce a low-frequency component of a current at a neutral-point end of the bus capacitor, thereby achieving effect of reducing voltage fluctuation on a positive bus capacitor and a negative bus capacitor. In another aspect, the balancing circuit does not need to cancel all of the voltage fluctuation generated by the inverter circuit at the neutral-point end of the bus capacitor, thereby reducing a design requirement on an output current capability of the balancing circuit, and reducing a loss and costs of the balancing circuit.

With reference to the first possible implementation of the second aspect, in a second possible implementation, the control method includes: first obtaining a current at the neutral-point input end of the inverter circuit; then obtaining a current low-frequency component through the filter; next, after a waveform generator performs waveform generation on the current low-frequency component, performing a multiplication operation on the current low-frequency component and the first preset proportion to obtain a current reference value at the output end of the balancing circuit; and then, obtaining, based on the current reference value at the output end of the balancing circuit and a current at the output end of the balancing circuit, a control signal adjusted by a control adjustor, where the control signal is used to control the balancing circuit and then control the current at the output end of the balancing circuit to tend to be consistent with the current reference value at the output end of the balancing circuit. The first preset proportion is less than 100%. After the control method is performed, a first preset proportion part in a low-frequency component of an effective value of the current at the neutral-point input end of the inverter circuit is provided by the balancing circuit, and a remaining part is provided by the bus capacitor. In addition, a high-frequency component of the current at the neutral-point input end of the inverter circuit and a high-frequency component of the current at the output end of the balancing circuit are still borne by the bus capacitor. In addition, because a waveform generator step is added to the control method, the balancing circuit only needs to output a current of a regular waveform. In the control method, based on the control method in the first possible implementation of the second aspect, function optimization that the balancing circuit only needs to output a current of a regular waveform is implemented, and a design requirement on the balancing circuit is further reduced, thereby further reducing a loss and costs of the balancing circuit.

With reference to the first possible implementation of the second aspect, in a third possible implementation, the control method includes: first obtaining a current at the neutral-point input end of the inverter circuit; then obtaining a current low-frequency component through the filter; next, performing Fourier transform on the current low-frequency component to obtain a fundamental component of the current low-frequency component; performing a subtraction operation on the current low-frequency component and the fundamental component to obtain remaining harmonic components of the current low-frequency component; then performing a multiplication operation on the fundamental component and the first preset proportion and adding an operation result to the remaining harmonic components to obtain a current reference value at the output end of the balancing circuit; and then, obtaining, based on the current reference value at the output end of the balancing circuit and a current at the output end of the balancing circuit, a control signal adjusted by the control adjustor, where the control signal is used to control the balancing circuit. Then, the current at the output end of the balancing circuit tends to be consistent with the current reference value at the output end of the balancing circuit. The first preset proportion is less than 100%. After the control method is performed, the current at the output end of the balancing circuit is a first preset proportion part in the fundamental component of the current low-frequency component and the remaining harmonic components of the current low-frequency component. Therefore, the bus capacitor only needs to bear a fundamental component of the current low-frequency component in a remaining proportion. In addition, a waveform of the fundamental component of the current low-frequency component in the remaining proportion is an expected regular waveform. This facilitates a specification design of the bus capacitor. In the control method, based on the control method in the first possible implementation of the second aspect, a design requirement on the bus capacitor is further reduced. This facilitates a specification design of the bus capacitor, improves flexibility of the current at the output end of the balancing circuit, and implements compensation and optimization for other performance of the system.

According to a third aspect, the embodiments provide a procedure for controlling a balancing circuit to work or stop, where the procedure is applied to the first possible implementation of the first aspect or the second possible implementation of the first aspect. The procedure provided includes the following.

With reference to the third aspect, in a first possible implementation, the procedure includes: detecting a positive bus capacitor voltage and a negative bus capacitor voltage of a bus capacitor; obtaining a bus capacitor voltage difference of the balancing circuit; determining whether the balancing circuit works; if the balancing circuit works, controlling a current at an output end of the balancing circuit according to the balancing circuit control method according to any one of the first possible implementation of the second aspect to the third possible implementation of the second aspect, or if the balancing circuit does not work, determining whether the bus capacitor voltage difference is greater than a first threshold; and if the bus capacitor voltage difference is greater than the first threshold, controlling the balancing circuit to start to work, where in this case, it indicates that fluctuation of the bus capacitor voltage is large, and the balancing circuit needs to work to provide a current for a neutral-point input end of an inverter circuit, or if the bus capacitor voltage difference is not greater than the first threshold, returning to the beginning of the procedure and performing work in the procedure again, where in this case, it indicates that fluctuation of the bus capacitor voltage is small, the balancing circuit does not need to work, and therefore, the procedure is returned to the beginning to perform determining again. By implementing this procedure, the balancing circuit of the inverter may be started only when fluctuation of the bus capacitor voltage of the inverter is excessively large, thereby improving working efficiency of the inverter.

With reference to the third aspect, in a second possible implementation, the procedure includes: obtaining a current at the neutral-point input end of the inverter circuit; determining whether the balancing circuit works; if the balancing circuit works, controlling a current at the output end of the balancing circuit according to the balancing circuit control method according to any one of the first possible implementation of the second aspect to the third possible implementation of the second aspect, or if the balancing circuit does not work, determining whether a current at the neutral-point input end of the inverter circuit is greater than a second threshold; and if the current at the neutral-point input end of the inverter circuit is greater than the second threshold, controlling the balancing circuit to start to work, where in this case, it indicates that the current at the neutral-point input end of the inverter circuit is large, and the balancing circuit needs to work to provide a current for the neutral-point input end of the inverter circuit, or if the current at the neutral-point input end of the inverter circuit is less than the second threshold, returning to the beginning of the procedure and performs work of this procedure again, where in this case, it indicates that the current at the neutral-point input end of the inverter circuit is small, and the balancing circuit does not need to work, and therefore, the procedure is returned to the beginning to perform determining again. In this procedure, the current at the neutral-point input end of the inverter circuit may be obtained through sampling performed by a sampling circuit, or may be obtained through calculation by using a circuit structure of the inverter circuit. By implementing this procedure, the balancing circuit of the inverter may be started only when the current at the neutral-point input end of the inverter circuit of the inverter is excessively large, thereby improving working efficiency of the inverter.

With reference to the first possible implementation of the third aspect, in a third possible implementation, the procedure includes: detecting a positive bus capacitor voltage and a negative bus capacitor voltage of the bus capacitor; obtaining a bus capacitor voltage difference of the balancing circuit; and determining whether the balancing circuit works. If the balancing circuit does not work, the procedure is similar to the procedure in the first possible implementation of the third aspect, and details are not described herein again. Alternatively, if the balancing circuit works, the procedure includes: controlling a current at the output end of the balancing circuit according to the balancing circuit control method according to any one of the first possible implementation of the second aspect to the third possible implementation of the second aspect; continuing to determine, after this step is completed, whether the bus capacitor voltage difference is less than a third threshold; and if the bus capacitor voltage difference is less than the third threshold, controlling the balancing circuit not to work, where in this case, it indicates that a bus capacitor voltage fluctuation degree is fully within a bearable range of the bus capacitor, and the balancing circuit does not need to additionally provide a balancing capability, or if the bus capacitor voltage difference is not less than the third threshold, which indicates that a bus capacitor voltage fluctuation degree of the balancing circuit is still large, returning to the beginning of the procedure to continue to perform adjustment, where the first threshold is greater than the third threshold. By implementing this procedure, on a basis of determining and controlling whether the balancing circuit works, a procedure of controlling the balancing circuit not to work is added. In this procedure, the balancing circuit may not work in a proper case, thereby reducing a loss of the inverter system.

With reference to the third possible implementation of the third aspect, in a fourth possible implementation, the procedure includes: detecting a positive bus capacitor voltage and a negative bus capacitor voltage of the bus capacitor; obtaining a bus capacitor voltage difference of the balancing circuit; and determining whether the balancing circuit works. If the balancing circuit does not work, the procedure is similar to the procedure in the first possible implementation of the third aspect, and details are not described herein again. Alternatively, if the balancing circuit works, the procedure includes: before controlling the balancing circuit to output a current, first comparing the bus capacitor voltage difference with a fifth threshold; if the buss capacitor voltage difference is not greater than the fifth threshold, which indicates that, in this case, a bus capacitor voltage fluctuation degree is large, but the balancing circuit meets a balancing requirement of the bus capacitor after working according to the first preset proportion, controlling a current at the output end of the balancing circuit according to the balancing circuit control method according to any one of the first possible implementation of the second aspect to the third possible implementation of the second aspect; continuing to determine, after this step is completed, whether the bus capacitor voltage difference is less than the third threshold; and if the bus capacitor voltage difference is less than the third threshold, controlling the balancing circuit not to work, where in this case, it indicates that a bus capacitor voltage fluctuation degree is fully within a bearable range of the bus capacitor, and the balancing circuit does not need to additionally provide a balancing capability, or if the bus capacitor voltage difference is not less than the third threshold, which indicates that a bus capacitor voltage fluctuation degree of the balancing circuit is still large, returning to the beginning of the procedure to continue to perform adjustment; or if the bus capacitor voltage difference is greater than the fifth threshold, which indicates that, in this case, a bus capacitor voltage fluctuation degree is large, and the balancing circuit cannot meet a balancing requirement of the bus capacitor after working according to the first preset proportion, increasing the first preset proportion to a second preset proportion, and then controlling a current at the output end of the balancing circuit according to the balancing circuit control method according to any one of the first possible implementation manner of the second aspect to the third possible implementation manner of the second aspect, where the second preset proportion is greater than the first preset proportion. The fifth threshold is greater than the third threshold. By implementing this procedure, the first preset proportion may be automatically increased when the balancing circuit works and the bus capacitor voltage difference is still large, so that the balancing circuit outputs different levels of currents in different cases, thereby reducing losses of the inverter system in different cases.

DETAILED DESCRIPTION OF EMBODIMENTS

With improvement of life quality, people have a higher requirement on power stability of a new energy power generation system. When a local alternating current power grid is faulty, the new energy power generation system should independently support a normal operation of a local alternating current load to some extent. Therefore, balancing circuits are designed for an increasing quantity of inverters that are core devices in the new energy power generation systems, to ensure that the local alternating current load can operate normally in an off-grid scenario. However, because there are various user local alternating current loads, and power consumption features of the user local alternating current loads are complex and changeable, design costs and a working loss of the balancing circuit are high.

The embodiments provide an inverter and an inverter system control method to control a current output by a balancing circuit and allocate current capability proportions of the balancing circuit and a bus capacitor, so that design costs and a working loss of the balancing circuit can be reduced. The solution is simple and effective, and has broad applicability.

The inverter provided in the embodiments may be used in a plurality of application fields, such as a field of power generation using renewable energy, a field of peak shaving and frequency modulation in conventional power generation, a field of supplying power to an important device, and a new energy vehicle field. This may be determined based on an actual application scenario, and is not limited herein. The inverter provided in the embodiments may be used in different power supply systems such as an energy storage system, an uninterruptible power supply system, and a motor drive system. This may be determined based on an actual application scenario, and is not limited herein. The inverter provided in the embodiments may be adapted to different application scenarios, for example, an application scenario in which an inverter circuit in a light energy power supply environment is controlled, an application scenario in which an inverter circuit in a wind energy power supply environment is controlled, an application scenario in which an inverter circuit in a pure energy storage power supply environment is controlled, or another application scenario. This is not limited herein.

To make a person skilled in the art better understand the solutions provided in embodiments, the following first describes the solutions of the embodiments by using an inverter system including a balancing circuit as an example.

Figure 1:
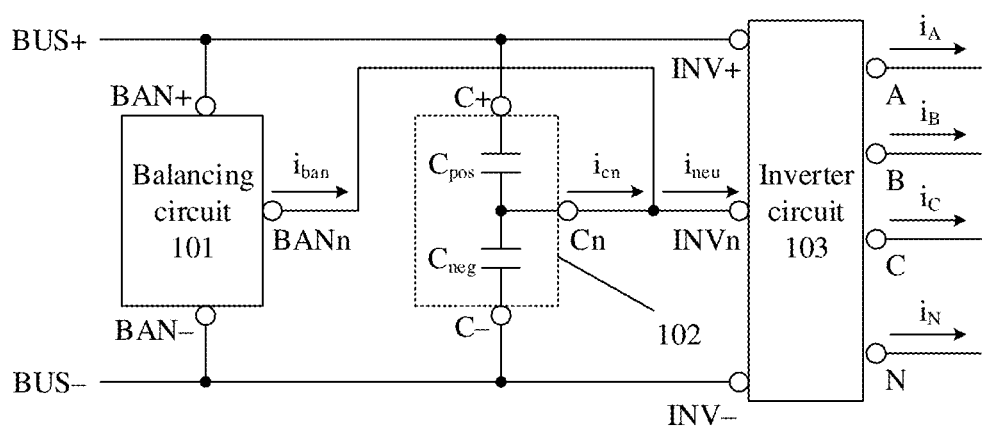
FIG. 1 is a schematic diagram of an inverter system including a balancing circuit.

FIG. 1 is a schematic diagram of an inverter system including a balancing circuit 101 according to the embodiments. For ease of description, a control method and a control procedure described below in the embodiments are all described by using the inverter system in the figure as an example. As shown in FIG. 1, the inverter system includes an inverter circuit 103, a bus capacitor 102, a balancing circuit 101, and positive and negative direct current buses. The inverter circuit 103 includes a positive input end INV+, a negative input end INV−, a neutral-point input end INVn, A-phase, B-phase, and C-phase three-phase output ends, and an N-phase output end. The neutral-point input end INVn is electrically coupled to the N-phase output end. The bus capacitor 102 includes a positive bus capacitor $C_{pos}$ and a negative bus capacitor $C_{neg}$ that are connected in series. One end of the positive bus capacitor $C_{pos}$ serves as a positive end C+ of the bus capacitor, and the other end of the positive bus capacitor $C_{pos}$ serves as a neutral-point end Cn of the bus capacitor 102 and is connected to one end of the negative bus capacitor $C_{neg}$. The other end of the negative bus capacitor $C_{neg}$ serves as a negative end C− of the bus capacitor 102. The balancing circuit 101 includes a positive input end BAN+, a negative input end BAN−, and an output end BANn. The positive and negative direct current buses include a positive direct current bus BUS+ and a negative direct current bus BUS−. The positive input end INV+ of the inverter circuit 103, the positive end C+ of the bus capacitor 102, and the positive input end BAN+ of the balancing circuit 101 are electrically coupled to the positive direct current bus BUS+. The negative input end INV− of the inverter circuit 103, the negative end C− of the bus capacitor 102, and the negative input end BAN− of the balancing circuit 101 are electrically coupled to the negative direct current bus BUS−. The neutral-point input end INVn of the inverter circuit 103, the neutral-point end Cn of the bus capacitor 102, and the output end BANn of the balancing circuit 101 are electrically coupled.

The inverter circuit 103 is configured to: convert a direct current voltage of the positive and negative direct current buses into a three-phase alternating current voltage, and provide the three-phase alternating current to the A-phase, B-phase, and C-phase three-phase output ends and the N-phase output end of the inverter circuit 103 in a three-phase four-wire form. The bus capacitor 102 is configured to keep a stable voltage between the positive direct current bus BUS+ and the negative direct current bus BUS−. The balancing circuit 101 is configured to: provide a current for the neutral-point input end INVn of the inverter circuit 103, and reduce a current provided by the bus capacitor 102 for the neutral-point input end INVn of the inverter circuit 103, to reduce voltage fluctuation on the positive bus capacitor $C_{pos}$ and the negative bus capacitor $C_{neg}$. For example, in FIG. 1, an electrical coupling point of the neutral-point input end INVn of the inverter circuit 103, the neutral-point end Cn of the bus capacitor 102, and the output end BANn of the balancing circuit 101 may be understood from Kirchhoff's law $i_{neu}=i_{ban}+i_{cn}$, where $i_{neu}$ is a current at the neutral-point input end of the inverter circuit 103, $i_{ban}$ is a current at the output end of the balancing circuit 101, and $i_{cn}$ is a current at the neutral-point end of the bus capacitor 102. It should be noted that the current $i_{neu}$ at the neutral-point input end of the inverter circuit 103 is determined by a topology, a working mode, and a current at the output end that are of the inverter circuit 103, and the current at the output end of the inverter circuit 103 is determined by a user load. Therefore, the current $i_{neu}$ at the neutral-point input end of the inverter circuit 103 is determined in a determined inverter system, a specific working condition, and a determined user load scenario. If any one of the foregoing conditions is changed, the current $i_{neu}$ at the neutral-point input end of the inverter circuit 103 changes. For example, after a user changes a local alternating current load, the current $i_{neu}$ at the neutral-point input end of the inverter circuit 103 changes. In a determined working condition and a determined load scenario, the current $i_{neu}$ at the neutral-point input end of the inverter circuit 103 is a specific value. According to $i_{neu}=i_{ban}+i_{cn}$, if the current $i_{ban}$ at the output end of the balancing circuit 101 increases, the current $i_{cn}$ at the neutral-point end of the bus capacitor 102 decreases; and if the current $i_{ban}$ at the output end of the balancing circuit 101 decreases, the current $i_{cn}$ at the neutral-point end of the bus capacitor 102 increases. In the embodiments, the current $i_{ban}$ at the output end of the balancing circuit 101 is properly adjusted and controlled, so that the current $i_{cn}$ at the neutral-point end of the bus capacitor 102 is within a proper range. In this way, voltage fluctuation generated by the inverter circuit 103 at the neutral-point end of the bus capacitor 102 is within a bearable range of the bus capacitor 102. One part of the voltage fluctuation is borne by the bus capacitor 102, and the other part of the voltage fluctuation is canceled by the balancing circuit 101.

The embodiments are applicable to two-phase and three-phase inverters. For example, FIG. 2 and FIG. 3 show some application scenarios of the embodiments.

Figure 2:
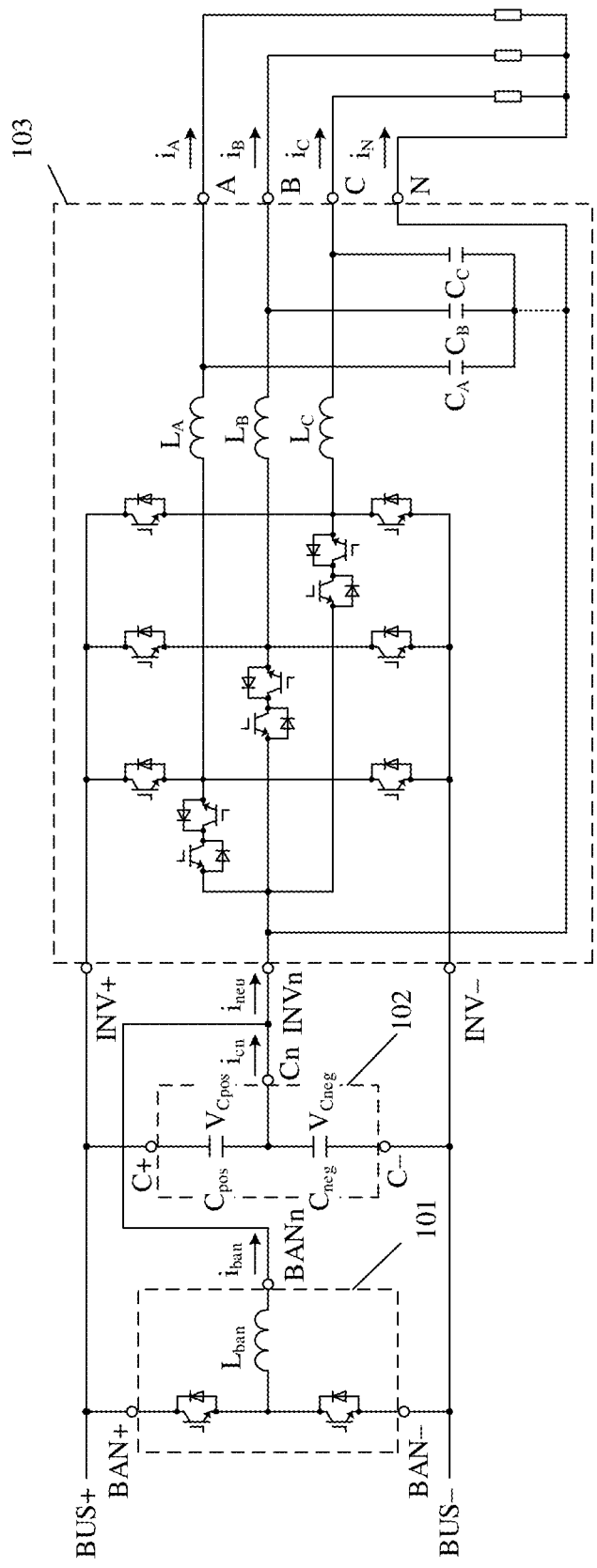
FIG. 2 shows a three-phase inverter system including a balancing circuit.
Figure 3:
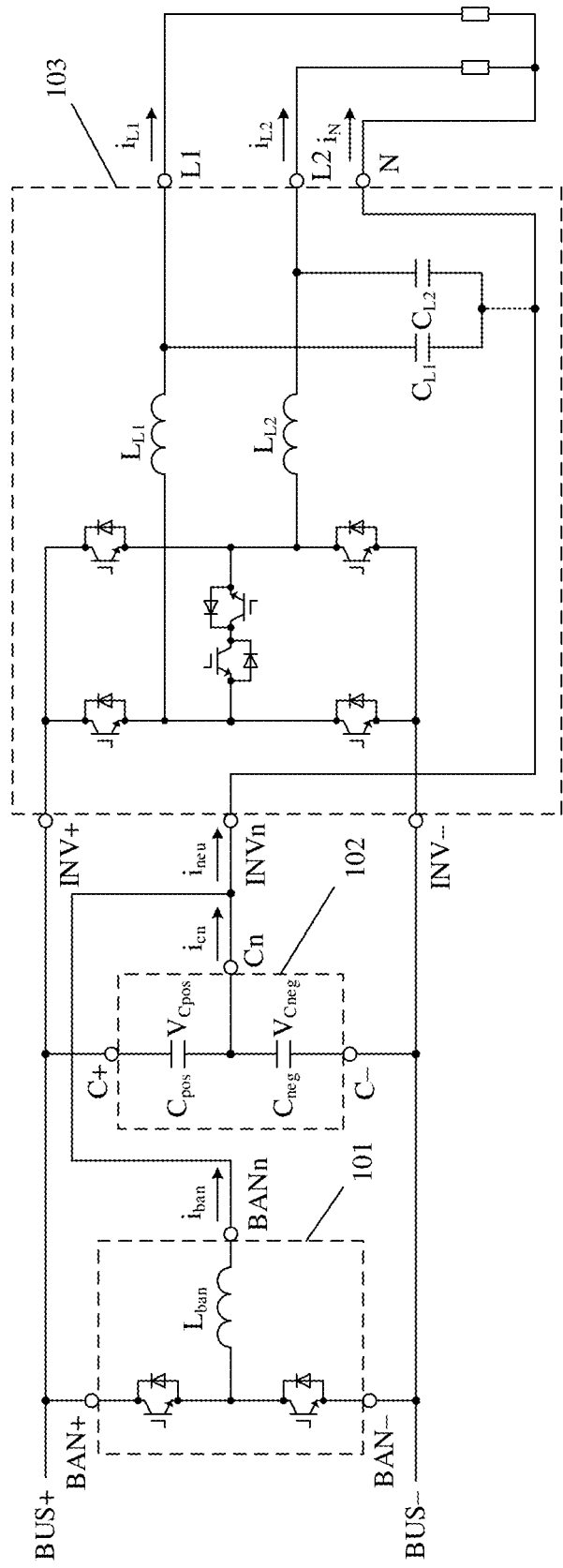
FIG. 3 shows a two-phase inverter system including a balancing circuit.

FIG. 2 shows a three-phase inverter system including the balancing circuit 101 according to the embodiments. As shown in FIG. 2, the three-phase inverter system includes the inverter circuit 103, the bus capacitor 102, and the balancing circuit 101. The inverter circuit 103 is a typical T-type three-phase three-level inverter circuit 103, and includes three groups of T-type three-level switching transistor bridge arms and three groups of LC filters. Positive ends of the three groups of T-type three-level switching transistor bridge arms are electrically connected to each other and serve as the positive input ends of the inverter circuit 103; negative ends of the three groups of T-type three-level switching transistor bridge arms are electrically connected to each other and serve as the negative input ends of the inverter circuit 103; and neutral-point ends of the three groups of T-type three-level switching transistor bridge arms are electrically connected to each other and serve as the neutral-point input ends of the inverter circuit 103. Three output ends of the three groups of LC filters serve as a phase-A output end, a phase-B output end, and a phase-C output end of the inverter circuit 103 respectively. The inverter circuit 103 further includes an N-phase output end. Neutral points of a filter capacitor $C_A$, a filter capacitor $C_B$, and a filter capacitor $C_C$ in the three groups of LC filters, the neutral-point input end of the inverter circuit 103, and the N-phase output end of the inverter circuit 103 are electrically connected. The bus capacitor 102 includes a positive bus capacitor $C_{pos}$ and a negative bus capacitor $C_{neg}$ that are connected in series. One end of the positive bus capacitor $C_{pos}$ and the positive input end of the inverter circuit 103 are electrically connected to the positive direct current bus. The other end of the positive bus capacitor $C_{pos}$ is a neutral-point end of the bus capacitor 102 and is electrically connected to the neutral-point input end of the inverter circuit 103 and one end of the negative bus capacitor $C_{neg}$. The other end of the negative bus capacitor $C_{neg}$, the negative input end of the inverter circuit 103, and the negative direct current bus are electrically connected. The balancing circuit 101 is a two-level circuit, including a two-level switching transistor bridge arm and a filter inductor. A positive end of the two-level switching transistor bridge arm serves as the positive input end of the balancing circuit 101 and is connected to the positive direct current bus. A negative end of the two-level switching transistor bridge arm serves as the negative input end of the balancing circuit 101 and is connected to the negative direct current bus. A neutral-point end of the two-level switching transistor bridge arm is connected to one end of the filter inductor, and the other end of the filter inductor serves as an output end of the balancing circuit 101 and is connected to the neutral-point input end of the inverter circuit 103.

For a family (or personal) user and an industrial and commercial user, the three-phase output ends of the inverter circuit 103 may be respectively connected to local loads with different features. Such loads are referred to as unbalanced loads. For example, the A-phase output end of the inverter circuit 103 is connected to a resistive load, the B-phase output end is connected to a capacitive load, and the C-phase output end is connected to an inductive load. An unbalanced local load generates an unbalanced current. The three-phase output ends of the inverter circuit 103 are further connected to a local alternating current power grid. In this case, the unbalanced current of the local load may be provided by the local alternating current power grid. However, when the local alternating current power grid is faulty, the inverter circuit 103 needs to provide energy for the unbalanced local load. In this case, the N-phase output end of the inverter circuit 103 is connected to a common end of the local load, and the inverter circuit 103 provides a loop for a common end current generated by the unbalanced local load. When the inverter circuit 103 provides energy for the unbalanced local load, a current provided by the bus capacitor 102 for the neutral-point input end of the inverter circuit 103 increases significantly. This causes sharp voltage fluctuation of the bus capacitor 102, and then causes the inverter circuit 103 to fail to work normally. The foregoing problem may be resolved by increasing a capacity of the bus capacitor 102. However, increasing the capacity of the bus capacitor 102 significantly increases a size of the inverter and increases costs of the inverter. Therefore, the balancing circuit 101 of the inverter circuit 103 may be used to provide a current for the neutral-point input end of the inverter circuit 103, and reduce the current provided by the bus capacitor 102 for the neutral-point input end of the inverter circuit 103, thereby reducing voltage fluctuation of the bus capacitor 102, and ensuring that the inverter circuit 103 works normally.

The output current of the balancing circuit 101 changes correspondingly based on a change of the current $i_{neu}$ at the neutral-point input end of the inverter circuit 103. Therefore, a first step of controlling the balancing circuit 101 is to obtain the current $i_{neu}$ at the neutral-point input end of the inverter circuit 103. The current $i_{neu}$ at the neutral-point input end of the inverter circuit 103 may be obtained by using a sampling circuit, or may be obtained through calculation based on currents $i_A$, $i_B$, and $i_C$ at the three-phase output ends of the inverter circuit 103, and a current $i_N$ at a neutral-point output end of the inverter circuit 103. A method for obtaining the current $i_{neu}$ at the neutral-point input end of the inverter circuit 103 through calculation is as follows. It is known that duty cycles of control signals of the three groups of T-type three-level switching transistor bridge arms of the inverter circuit 103 are $D_A$, $D_B$, and $D_C$. In this case, currents at neutral-point ends of the three groups of T-type three-level switching transistor bridge arms of the inverter circuit 103 are $i_A*(1-|D_A|)$, $i_B*(1-|D_B|)$, and $i_C*(1-|D_C|)$, and the current $i_N$ at the neutral-point output end of the inverter circuit 103 is $-(i_A+i_B+i_C)$. When a high-frequency component of the foregoing current is not considered, the current at the neutral-point input end of the inverter circuit 103 may be obtained after approximate calculation, and $i_{neu}=i_A*(1-|D_A|)+i_B*(1-|D_B|)+i_C*(1-|D_C|)-(i_A+i_B+i_C)$. An approximate value of the current at the neutral-point input end of the inverter circuit 103 is obtained through calculation based on an actual circuit topology and by using existing current sampling values of the inverter, so that the balancing circuit can be controlled without an additional current sampling circuit at the neutral-point input end of the inverter circuit 103. In addition, hardware costs of the inverter are reduced. It should be noted that a manner of obtaining the current at the neutral-point input end of the inverter circuit 103 is not limited.

In the embodiments, when the neutral points of the filter capacitor $C_A$, the filter capacitor $C_B$, and the filter capacitor $C_C$ in the three groups of LC filters are electrically connected to the neutral-point input end of the inverter circuit 103, a part of a common mode current generated by the inverter bridge arm in the inverter circuit 103 may flow back to the neutral-point input end of the inverter circuit 103 through the neutral points of the filter capacitor $C_A$, the filter capacitor $C_B$, and the filter capacitor $C_C$ in the three groups of LC filters, to reduce a common mode current flowing into the user load. When the neutral points of the filter capacitor $C_A$, the filter capacitor $C_B$, and the filter capacitor $C_C$ in the three groups of LC filters are electrically disconnected from the neutral-point input end of the inverter circuit 103, almost all of the common mode current generated by the inverter bridge arm of the inverter circuit 103 flows into the user load, and common mode current adjustment may be implemented on the user load in some special scenarios. Whether the neutral points of the filter capacitor $C_A$, the filter capacitor $C_B$, and the filter capacitor $C_C$ in the three groups of LC filters are electrically connected to the neutral-point input end of the inverter circuit 103 is not limited.

FIG. 3 shows a two-phase inverter system including the balancing circuit 101 according to the embodiments. Replacing the inverter circuit 103 in the three-phase inverter system in FIG. 2 is also applicable to the embodiments. For example, FIG. 3 shows a result of replacing the typical T-type three-phase three-level inverter circuit 103 in FIG. 2 with two-phase Heric inverter circuit 103. A specific form of the inverter circuit 103 is not limited. For example, the inverter circuit 103 may alternatively be a neutral-point-clamped three-level three-phase inverter circuit or an active neutral-point-clamped three-level three-phase inverter circuit, or the like. As shown in FIG. 3, the two-phase inverter system includes the inverter circuit 103, the bus capacitor 102, and the balancing circuit 101. The inverter circuit 103 is a Heric inverter circuit 103, and includes two groups of vertical-bridge switching transistor bridge arms, one group of horizontal-bridge switching transistor bridge arms, and two groups of LC filters. Positive ends of the two groups of vertical-bridge switching transistor bridge arms serve as the positive input ends of the inverter circuit 103, and negative ends of the two groups of vertical-bridge switching transistor bridge arms serve as the negative input ends of the inverter circuit 103. Two output ends of the two groups of LC filters serve as an L1-phase output end and an L2-phase output end of the inverter circuit 103 respectively. The inverter circuit 103 further includes an N-phase output end and a neutral-point input end. The neutral-point input end of the inverter circuit 103 is connected to the N-phase output end of the inverter circuit 103. Neutral points of a filter capacitor $C_{L1}$ and a filter capacitor $C_{L2}$ in the two groups of LC filters may be electrically connected to the N-phase output end of the inverter circuit 103, or may be electrically disconnected from the N-phase output end of the inverter circuit 103.

Similarly, when a user load is a two-phase unbalanced load, the balancing circuit 101 of the inverter circuit 103 may reduce voltage fluctuation of the bus capacitor 102. A principle is similar to that in FIG. 2. Details are not described herein again.

A current at the neutral-point input end of the inverter circuit 103 in the two-phase inverter system may also be obtained by using a sampling circuit, or may be obtained through calculation. A method for obtaining the current $i_{neu}$ at the neutral-point input end of the inverter circuit 103 through calculation is as follows: $i_{neu} = -(i_{L1} + i_{L2})$.

Figure 4:
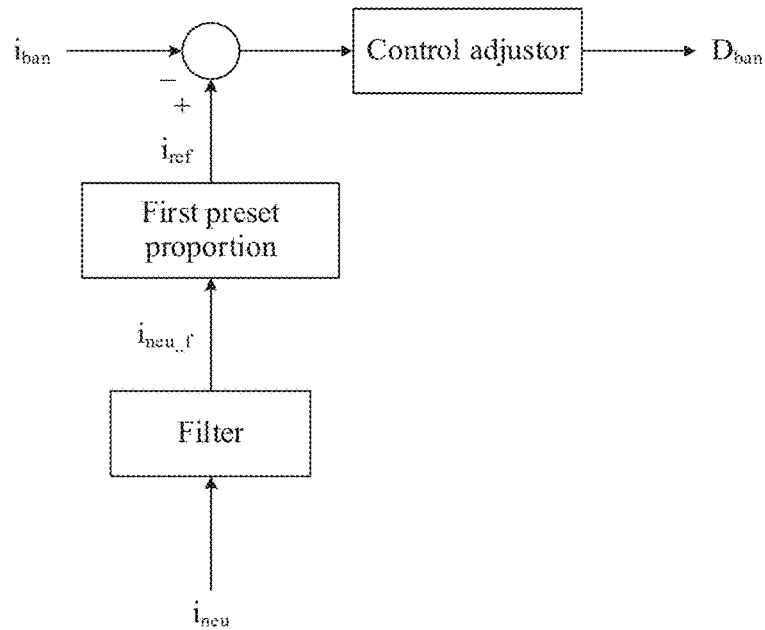
FIG. 4 shows a balancing circuit control method.
Figure 5:
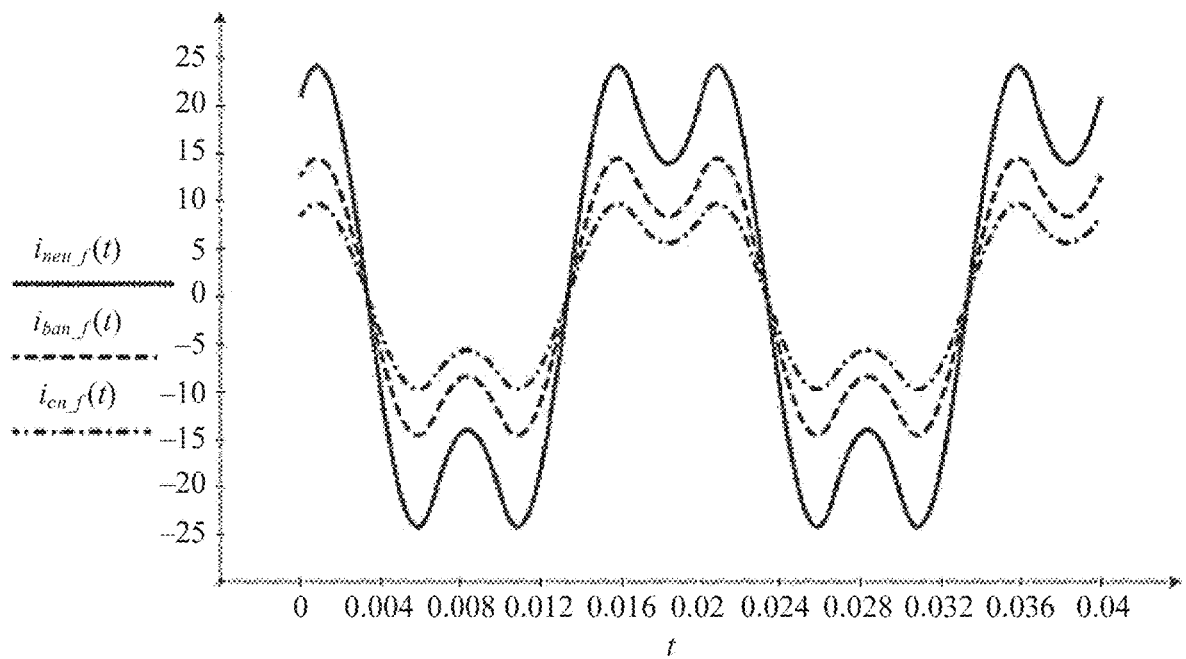
FIG. 5 shows current waveforms in a balancing circuit control method.

Refer to FIG. 4 and FIG. 5 together. FIG. 4 shows a balancing circuit control method according to the embodiments, and FIG. 5 shows a current waveform for implementing the balancing circuit control method in FIG. 4. As shown in FIG. 4, the balancing circuit control method includes: first obtaining a current $i_{neu}$ at a neutral-point input end of an inverter circuit; then obtaining a current low-frequency component $i_{neu\_f}$ through a filter; next, performing a multiplication operation on the current low-frequency component $i_{neu\_f}$ and a first preset proportion to obtain a current reference value $i_{ref}$ at an output end of the balancing circuit; and then obtaining, based on the current reference value $i_{ref}$ at the output end of the balancing circuit and a current $i_{ban}$ at the output end of the balancing circuit, a control signal $D_{ban}$ adjusted by a control adjustor, where the control signal $D_{ban}$ is used to control the balancing circuit. Then, the current $i_{ban}$ at the output end of the balancing circuit tends to be consistent with the current reference value $i_{ref}$ at the output end of the balancing circuit. The first preset proportion is less than 100%. The current $i_{neu}$ that is at the neutral-point input end of the inverter circuit and that is borne by the bus capacitor includes a high-frequency component caused by a switching action performed by the inverter circuit, and a low-frequency component caused by currents $i_A$, $i_B$, and $i_C$ at the three-phase output ends of the inverter circuit and a current at the N-phase output end of the inverter circuit. The current $i_{ban}$ at the output end of the balancing circuit includes a high-frequency component caused by a switching action performed by the balancing circuit, and a low-frequency component output after being controlled by the control signal $D_{ban}$. After the control method in FIG. 4 is performed, a first preset proportion part in the low-frequency component of the current $i_{neu}$ at the neutral-point input end of the inverter circuit is provided by the balancing circuit, and a remaining low-frequency component is provided by the bus capacitor. In addition, a high-frequency component of the current $i_{neu}$ at the neutral-point input end of the inverter circuit and a high-frequency component of the current $i_{ban}$ at the output end of the balancing circuit are still borne by the bus capacitor.

FIG. 5 shows current waveforms when the balancing circuit control method in FIG. 4 is used, the phase-A output end of the inverter circuit is connected to a resistive load and outputs a 20 A current, the phase-B output end of the inverter circuit is connected to a resistive load and outputs a 20 A current, the phase-C output end of the inverter circuit has no output, and the first preset proportion is 60%. A solid-line waveform is the low-frequency component $i_{neu\_f}$ of the current $i_{neu}$ at the neutral-point input end of the inverter circuit, a dashed-line waveform is a low-frequency component $i_{ban\_f}$ of the current $i_{ban}$ at the output end of the balancing circuit, and a dash-dot-line waveform is a low-frequency component $i_{cn\_f}$ a current $i_{cn}$ at a neutral-point end of the bus capacitor. Based on $i_{neu\_f}$, the first preset proportion 60%, and a proper control adjustor design, an amplitude of the low-frequency component $i_{ban\_f}$ of the current at the output end of the balancing circuit is about 60% of $i_{neu\_f}$, and the low-frequency component $i_{ban\_f}$ may cancel a part of $i_{neu\_f}$, to reduce the low-frequency component $i_{cn\_f}$ of the current at the neutral-point end of the bus capacitor. It can be seen that an amplitude of the low-frequency component $i_{cn\_f}$ of the current at the neutral-point end of the bus capacitor is about 40% of $i_{neu\_f}$.

In the embodiments, in one aspect, the current at the output end of the balancing circuit may reduce a low-frequency component of a current at a neutral-point end of the bus capacitor, thereby achieving effect of reducing voltage fluctuation on a positive bus capacitor and a negative bus capacitor. In another aspect, the balancing circuit does not need to cancel all of the voltage fluctuation generated by the inverter circuit at the neutral-point end of the bus capacitor, thereby reducing a design requirement on an output current capability of the balancing circuit, and reducing a loss and costs of the balancing circuit. Generally, to obtain sufficient loss and cost benefits on the balancing circuit, the first preset proportion should be less than 90%, and a part that is generated by the inverter circuit at the neutral-point end of the bus capacitor and that is not cancelled by the balancing circuit is still borne by the bus capacitor. Based on proper selection of the first preset proportion, voltage fluctuation borne by the bus capacitor is still within a design specification range of the bus capacitor, thereby ensuring that the bus capacitor works reliably. That is, in the embodiments, a capability of the bus capacitor to withstand voltage fluctuation may be fully utilized, and a requirement on the balancing circuit may be reduced, thereby implementing a trade-off design between the bus capacitor and the balancing circuit.

Figure 6:
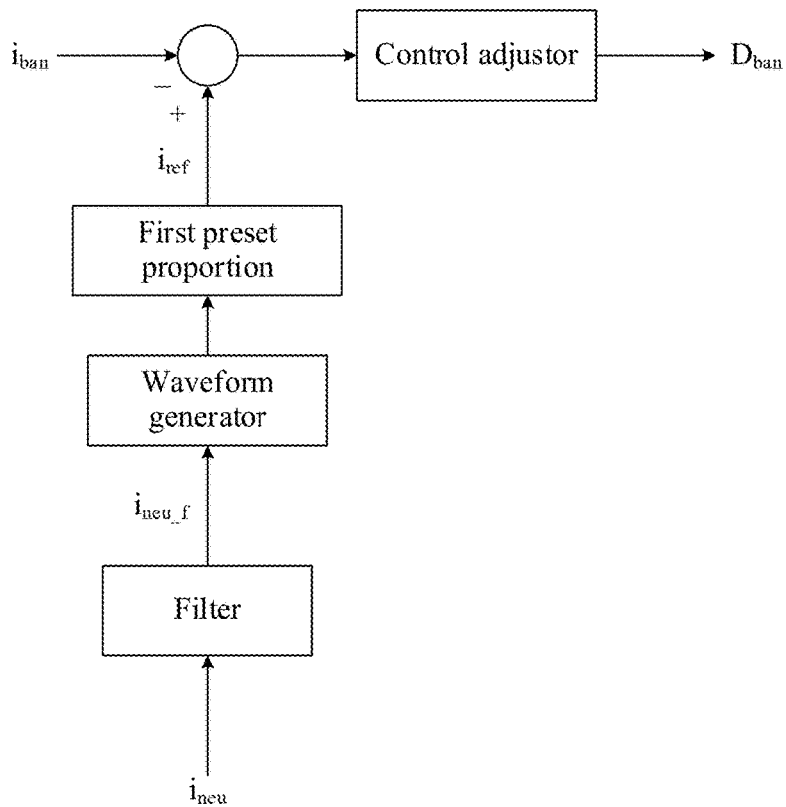
FIG. 6 shows another balancing circuit control method.
Figure 7:
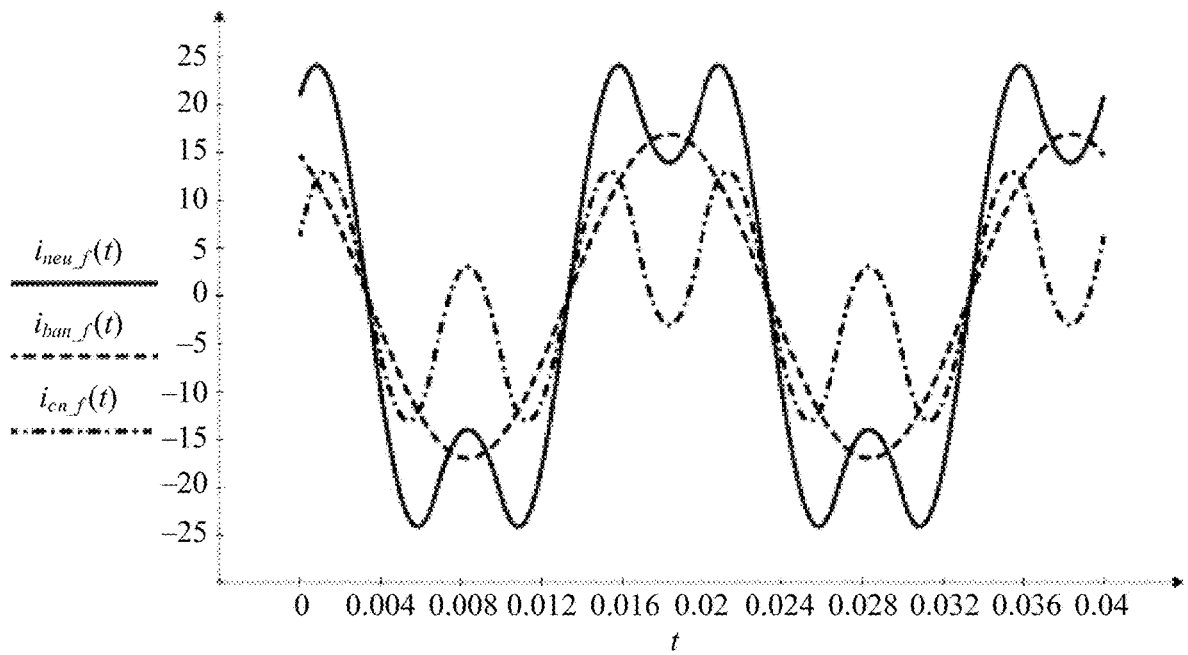
FIG. 7 shows current waveforms in another balancing circuit control method.

Refer to FIG. 6 and FIG. 7 together. FIG. 6 shows another balancing circuit control method according to the embodiments, and FIG. 7 shows a current waveform for implementing the balancing circuit control method in FIG. 6. As shown in FIG. 6, the balancing circuit control method includes: first obtaining a current $i_{neu}$ at a neutral-point input end of an inverter circuit; then obtaining a current low-frequency component $i_{neu\_f}$ through a filter; next, after a waveform generator performs waveform generation on the current low-frequency component, performing a multiplication operation on the current low-frequency component $i_{neu\_f}$ and a first preset proportion to obtain a current reference value $i_{ref}$ at an output end of the balancing circuit; and then obtaining, based on the current reference value $i_{ref}$ at the output end of the balancing circuit and a current $i_{ban}$ at the output end of the balancing circuit, a control signal $D_{ban}$ adjusted by a control adjustor, where the control signal $D_{ban}$ is used to control the balancing circuit. Then, the current $i_{ban}$ at the output end of the balancing circuit tends to be consistent with the current reference value $i_{ref}$ at the output end of the balancing circuit. The first preset proportion is less than 100%. A difference between the control method shown in FIG. 6 and the control method shown in FIG. 4 lies in the following: A step of performing waveform conversion by the waveform generator is added to a process of generating the current reference value $i_{ref}$ at the output end of the balancing circuit. After the current low-frequency component $i_{neu\_f}$ is obtained through the filter based on the current $i_{neu}$ at the middle point input end of the inverter circuit, the waveform generator may generate, based on the current low-frequency component $i_{neu\_f}$, an equivalent sinusoidal waveform having a same frequency and a same phase as the $i_{neu\_f}$, and then obtain the reference value $i_{ref}$ of the current at the output end of the balancing circuit based on the first preset proportion, where a waveform of the current reference value is a sinusoidal waveform. Then, the current $i_{ban}$ that is at the output end of the balancing circuit and that is adjusted by a controller is also of a sinusoidal waveform, and a valid value of the $i_{ban}$ is a first preset proportion of a valid value of the low frequency component of the $i_{neu}$. An effect achieved by the control method in FIG. 6 is similar to that achieved by the control method in FIG. 4. After the control method in FIG. 6 is performed, a first preset proportion part in the valid value of the low-frequency component of the current $i_{neu}$ at the neutral-point input end of the inverter circuit is provided by the balancing circuit, and a remaining part is provided by the bus capacitor. In addition, a high-frequency component of the current $i_{neu}$ at the neutral-point input end of the inverter circuit and a high-frequency component of the current $i_{ban}$ at the output end of the balancing circuit are still borne by the bus capacitor. In addition, because a waveform generator step is added to the control method, the balancing circuit only needs to output a current of a regular waveform, thereby greatly reducing design difficulty of the balancing circuit.

FIG. 7 shows current waveforms when the balancing circuit control method in FIG. 6 is used, the phase-A output end of the inverter circuit is connected to a resistive load and outputs a 20 A current, the phase-B output end of the inverter circuit is connected to a resistive load and outputs a 20 A current, the phase-C output end of the inverter circuit has no output, and the first preset proportion is 60%. A solid-line waveform is the low-frequency component $i_{neu\_f}$ of the current $i_{neu}$ at the neutral-point input end of the inverter circuit, a dashed-line waveform is a low-frequency component $i_{ban\_f}$ of the current $i_{ban}$ at the output end of the balancing circuit, and a dash-dot-line waveform is a low-frequency component $i_{cn\_f}$ a current $i_{cn}$ at a neutral-point end of the bus capacitor. Based on $i_{neu\_f}$, a sinusoidal waveform generator, the first preset proportion 60%, and a proper control adjustor design, the low-frequency component $i_{ban\_f}$ of the current at the output end of the balancing circuit is a current of a sinusoidal waveform, an effective value thereof is about 60% of an effective value of $i_{neu\_f}$, and a frequency and a phase thereof are the same as those of $i_{neu\_f}$, $i_{ban\_f}$ may cancel a part of $i_{neu\_f}$, thereby reducing the low-frequency component $i_{cn\_f}$ of the current at the neutral-point end of the bus capacitor.

According to the control method shown in FIG. 6, the low-frequency component of the current at the neutral-point end of the bus capacitor can also be reduced, thereby ensuring reliability of the bus capacitor. In addition, based on the control method in FIG. 4, a design requirement on the balancing circuit is further reduced, thereby further reducing a loss and costs of the balancing circuit. It should be noted that the waveform generator in FIG. 6 is not limited to a sinusoidal waveform generator, and may alternatively be a waveform generator of another type, to control the balancing circuit to output a current of a different waveform. The waveform generator in the embodiments includes, but is not limited to: a waveform generator for generating sinusoidal waveforms, triangular waveforms, or square waveforms whose valid values and phase angles are the same, a waveform generator for generating waveforms whose amplitudes or peak values are the same, a waveform generator for generating waveforms whose phase angles differ by a specific angle, and the like. In this way, flexibility of the current at the output end of the balancing circuit is improved, and compensation and optimization for other performance of the system are implemented.

Figure 8:
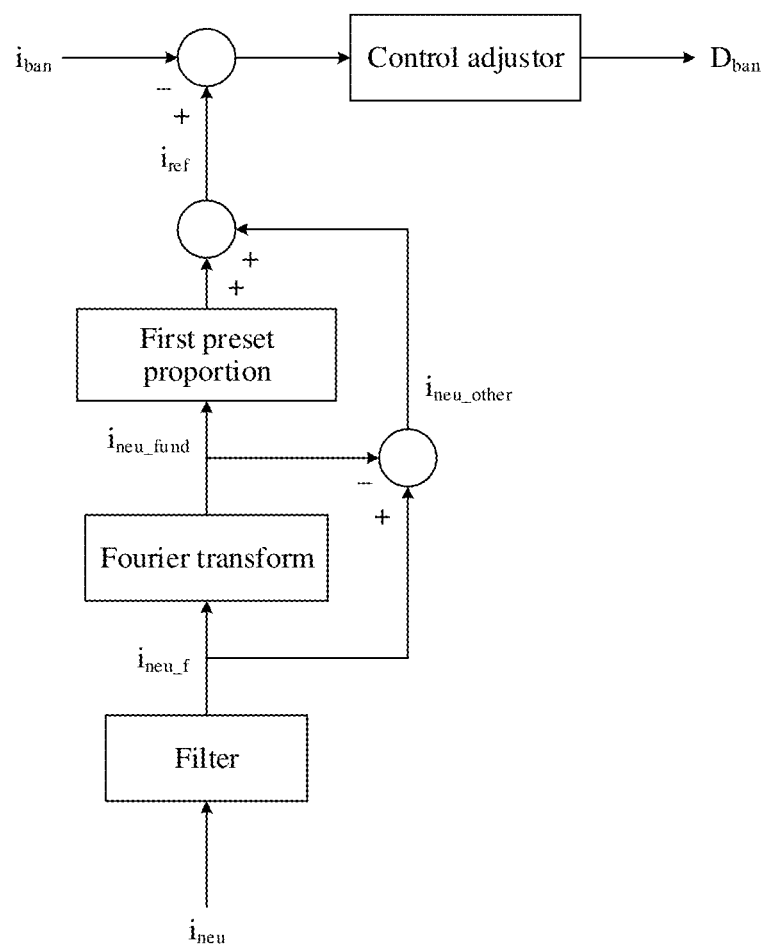
FIG. 8 shows another balancing circuit control method.
Figure 9:
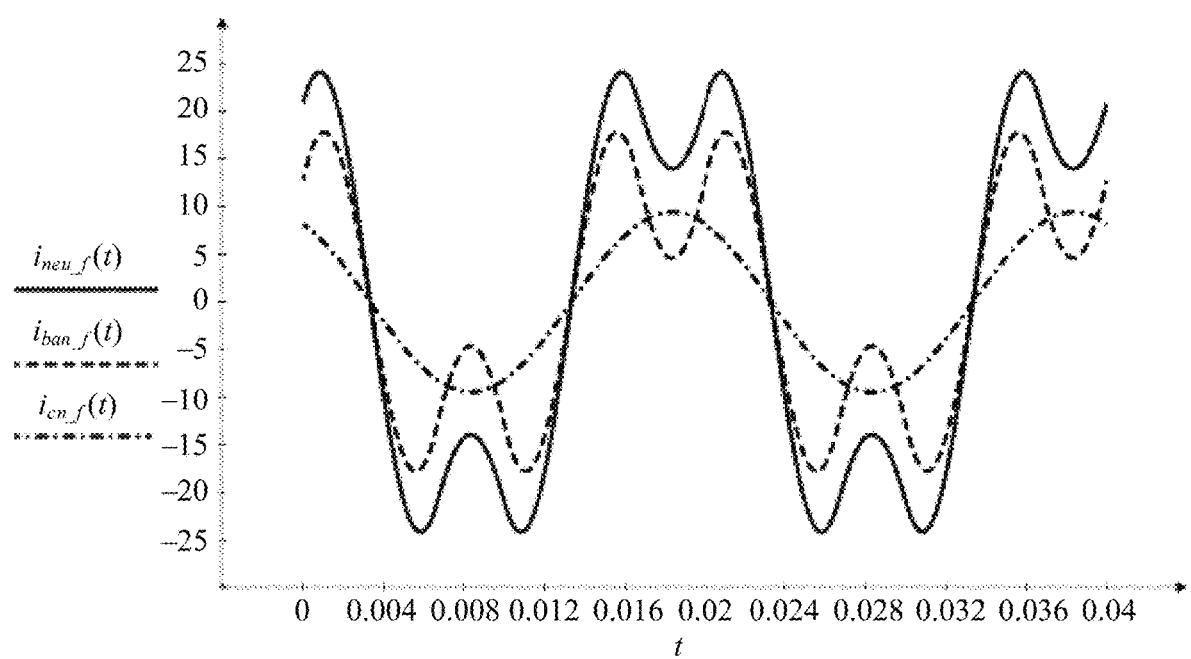
FIG. 9 shows current waveforms in another balancing circuit control method.

Refer to FIG. 8 and FIG. 9 together. FIG. 8 shows another balancing circuit control method according to the embodiments, and FIG. 9 shows a current waveform for implementing the balancing circuit control method in FIG. 8. As shown in FIG. 8, the balancing circuit control method includes: first obtaining a current $i_{neu}$ at the neutral-point input end of the inverter circuit; then obtaining a current low-frequency component $i_{neu\_f}$ through the filter; next, performing Fourier transform on the current low-frequency component $i_{neu\_f}$ to obtain a fundamental component $i_{neu\_fund}$ of the current low-frequency component and other remaining harmonic components $i_{neu\_other}$; then performing a multiplication operation on the fundamental component $i_{neu\_fund}$ and the first preset proportion and adding an operation result to the remaining harmonic components $i_{neu\_other}$ to obtain a current reference value $i_{ref}$ at the output end of the balancing circuit; and then, obtaining, based on the current reference value $i_{ref}$ at the output end of the balancing circuit and a current $i_{ban}$ at the output end of the balancing circuit, a control signal $D_{ban}$ adjusted by the control adjustor, where the control signal $D_{ban}$ is used to control the balancing circuit. Then, the current $i_{ban}$ at the output end of the balancing circuit tends to be consistent with the current reference value $i_{ref}$ at the output end of the balancing circuit. The first preset proportion is less than 100%. A difference between the control method shown in FIG. 8 and the control method shown in FIG. 4 lies in the following: A Fourier transform process is added to a process of generating the current reference value $i_{ref}$ at the output end of the balancing circuit, and in a subsequent step of obtaining the current reference value $i_{ref}$ at the output end of the balancing circuit, a proportional operation is performed only on the fundamental component $i_{neu\_f}$ und of the current low-frequency component $i_{neu\_f}$ and the remaining harmonic components $i_{neu\_other}$ of the current low-frequency component $i_{neu\_f}$ are retained. After the current low-frequency component $i_{neu\_f}$ is obtained through the filter based on the current $i_{neu}$ at the neutral-point input end of the inverter circuit, in the Fourier transform process, the current low-frequency component $i_{neu\_f}$ may be decomposed into the fundamental component $i_{neu\_f}$ und and the remaining harmonic components $i_{neu\_other}$; and then, the fundamental component $i_{neu\_fund}$ is multiplied by the first preset proportion before being added to the remaining harmonic components $i_{neu\_other}$ to obtain the current reference value $i_{ref}$ at the output end of the balancing circuit. When the current reference value $i_{ref}$ that is at the output end of the balancing circuit and that is obtained through the foregoing process is compared with the current low-frequency component $i_{neu\_f}$, the fundamental component of the current reference value $i_{ref}$ at the output end of the balancing circuit is the same as the first preset proportion of the fundamental component of the current low-frequency component $i_{neu\_f}$; and the remaining harmonic components of the current reference value $i_{ref}$ at the output end of the balancing circuit are the same as the remaining harmonic components of the current low-frequency component $i_{neu\_f}$. On a basis of the effect achieved by the control method in FIG. 4, that is, on a basis that a capability of the bus capacitor to withstand voltage fluctuation is fully utilized and a requirement on the balancing circuit is reduced, due to the addition of the Fourier transform process, the current $i_{ban}$ at the output end of the balancing circuit then includes all the remaining harmonic components $i_{neu\_other}$ of the current low-frequency component $i_{neu\_f}$. In this way, the bus capacitor only needs to bear some fundamental components of the current low-frequency component $i_{neu\_f}$, thereby facilitating a specification design of the bus capacitor.

FIG. 9 shows current waveforms when the balancing circuit control method in FIG. 8 is used, the phase-A output end of the inverter circuit is connected to a resistive load and outputs a 20 A current, the phase-B output end of the inverter circuit is connected to a resistive load and outputs a 20 A current, the phase-C output end of the inverter circuit has no output, and the first preset proportion is 60%. A solid-line waveform is the low-frequency component $i_{neu\_f}$ of the current $i_{neu}$ at the neutral-point input end of the inverter circuit, a dashed-line waveform is a low-frequency component $i_{ban\_f}$ of the current $i_{ban}$ at the output end of the balancing circuit, and a dash-dot-line waveform is a low-frequency component $i_{cn\_f}$ a current $i_{cn}$ at a neutral-point end of the bus capacitor. Based on $i_{neu\_f}$ the Fourier transform process, the first preset proportion 60%, and a proper control adjustor design, the low-frequency component $i_{ban\_f}$ of the current at the output end of the balancing circuit is a waveform. A fundamental component of the waveform is the same as 60% of the fundamental component of $i_{neu\_f}$ and remaining harmonic components of the waveform are the same as the remaining harmonic components of $i_{neu\_f}$. The low-frequency component $i_{ban\_f}$ may cancel 60% of the fundamental component of $i_{neu\_f}$ and all the remaining harmonic components of $i_{neu\_f}$, thereby ensuring that the bus capacitor bears only 40% of the fundamental component of $i_{neu\_f}$.

According to the control method shown in FIG. 8, a design requirement on the balancing circuit can also be reduced, and a loss and costs of the balancing circuit can be reduced. In addition, based on the control method in FIG. 4, a design requirement on the bus capacitor is further reduced, the bus capacitor only needs to bear a part of the fundamental component of the low-frequency component $i_{neu\_f}$. It should be noted that, in FIG. 8, the fundamental component in the Fourier transform process may be an expected fundamental component, and the remaining harmonic components may be specific-order harmonic components, to ensure that the current at the neutral-point end of the bus capacitor includes the expected fundamental component but does not include the specific harmonic components. This facilitates a specification design of the bus capacitor, improves flexibility of the current at the output end of the balancing circuit, and implements compensation and optimization for other performance of the system.

The foregoing content describes a method for controlling working of the balancing circuit, and explains how the balancing circuit is used in the embodiments to achieve effect of collaboratively sharing current fluctuation by the bus capacitor and the balancing circuit. In an actual working process of an inverter product, the current at the neutral-point input end of the inverter circuit may need to reach a specific value, that is, voltage fluctuation borne by the bus capacitor can need to reach a specific level, before the balancing circuit starts to work. In this way, working efficiency of the inverter product is improved. The following content describes in detail a procedure of controlling the balancing circuit to work or not to work in the embodiments.

In the following procedure, a manner of determining whether the balancing circuit works includes, but is not limited to, the following: if the controller sends a drive signal to a switching transistor of the balancing circuit, the balancing circuit works; or if the controller does not send a drive signal to a switching transistor of the balancing circuit, the balancing circuit does not work.

Figure 10:
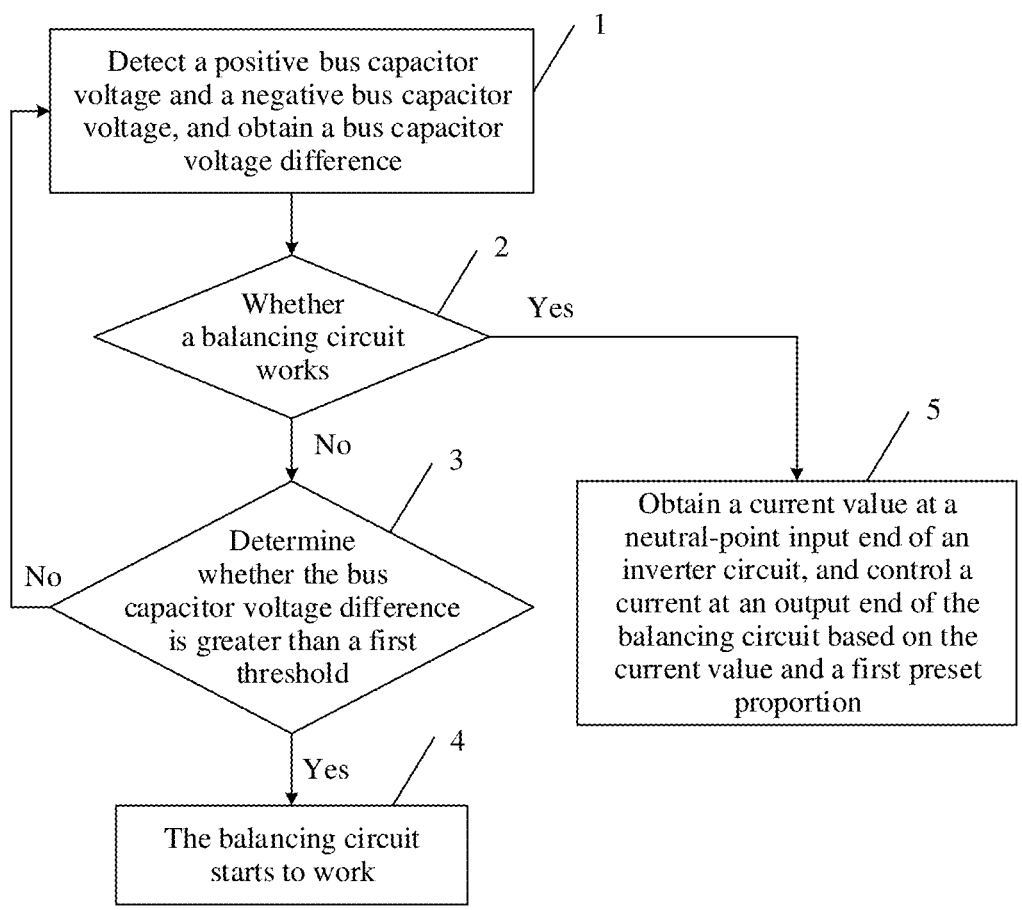
FIG. 10 shows a procedure of controlling a balancing circuit to work.

FIG. 10 shows a procedure of controlling a balancing circuit to work according to the embodiments. As shown in FIG. 10, the procedure of controlling the balancing circuit to work includes the following steps.

Step 1: Detect a positive bus capacitor voltage and a negative bus capacitor voltage, and perform difference calculation to obtain a bus capacitor voltage difference. Step 2 is performed.

Step 2: Determine whether the balancing circuit works. If the balancing circuit works, step 5 is performed; or if the balancing circuit does not work, step 3 is performed.

Step 5: Obtain a current at a neutral-point input end of the inverter circuit, and control a current at an output end of the balancing circuit based on a current value and a first preset proportion. In this step, a specific control method for controlling the current at the output end of the balancing circuit may be any control method described in FIG. 4 to FIG. 9.

Step 3: Determine whether the bus capacitor voltage difference is greater than a first threshold. If the bus capacitor voltage difference is greater than the first threshold, step 4 is performed; or if the bus capacitor voltage difference is not greater than the first threshold, step 1 is performed. In this step, whether the balancing circuit needs to work is determined. When the voltage difference of the bus capacitor is greater than the first threshold, that is, in the inverter system, an unbalanced current required by a user local alternating current load is large, the balancing circuit needs to work to additionally provide a balancing capability. When the bus capacitor voltage difference is not greater than the first threshold, in the inverter system, a balancing capability of the bus capacitor is sufficient and can provide an unbalanced current required by the user local alternating current load, and temporarily, the balancing circuit does not need to work. To ensure that the bus capacitor can work normally, step 1 is performed again, to monitor the bus capacitor voltage difference.

Step 4: The balancing circuit starts to work.

Figure 11:
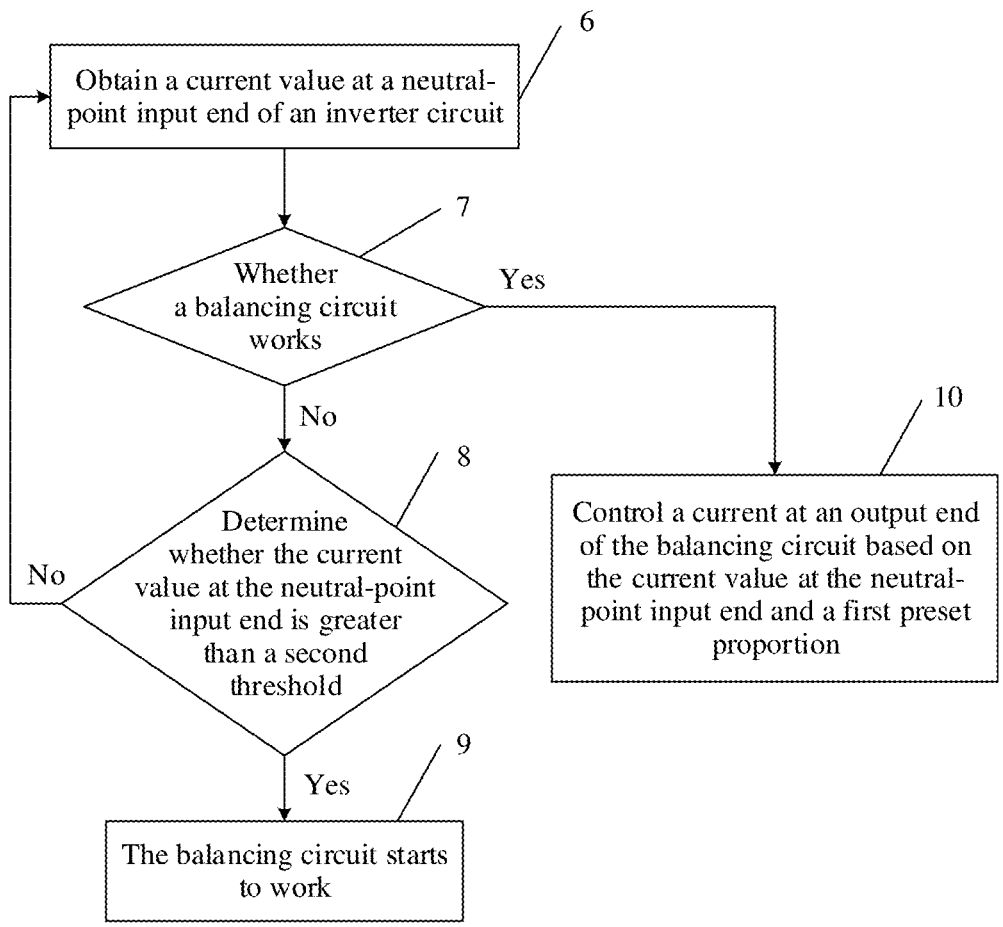
FIG. 11 shows another procedure of controlling a balancing circuit to work.

FIG. 11 shows another procedure of controlling a balancing circuit to work according to the embodiments. A difference between the control procedure in FIG. 11 and the control procedure in FIG. 10 lies in the following: Different determining objects are selected when whether the balancing circuit needs to work is determined. As shown in FIG. 11, the procedure of controlling the balancing circuit to work includes the following steps.

Step 6: Obtain the current at the neutral-point input end of the inverter circuit. Step 7 is performed.

Step 7: Determine whether the balancing circuit works. If the balancing circuit works, step 10 is performed; or if the balancing circuit does not work, step 8 is performed.

Step 10: Control the current at the output end of the balancing circuit based on the current at the neutral-point input end of the inverter circuit and the first preset proportion. In this step, a specific control method for controlling the current at the output end of the balancing circuit may be any control method described in FIG. 4 to FIG. 9.

Step 8: Determine whether the current at the neutral-point input end of the inverter circuit is greater than a second threshold. If the current at the neutral-point input end of the inverter circuit is greater than the second threshold, step 9 is performed; or if the current at the neutral-point input end of the inverter circuit is not greater than the second threshold, step 6 is performed. In this step, whether the balancing circuit needs to work is determined. When the current at the neutral-point input end of the inverter circuit is greater than the second threshold, that is, in the inverter system, an unbalanced current required by a user local alternating current load is large, the balancing circuit needs to work to additionally provide a balancing capability. When the current at the neutral-point input end of the inverter circuit is not greater than the second threshold, in the inverter system, a balancing capability of the bus capacitor is sufficient and can provide an unbalanced current required by the user local alternating current load, and temporarily, the balancing circuit does not need to work. To ensure that the bus capacitor can work normally, step 6 is performed again, to monitor the current at the neutral-point input end of the inverter circuit.

Step 9: The balancing circuit starts to work.

Figure 12:
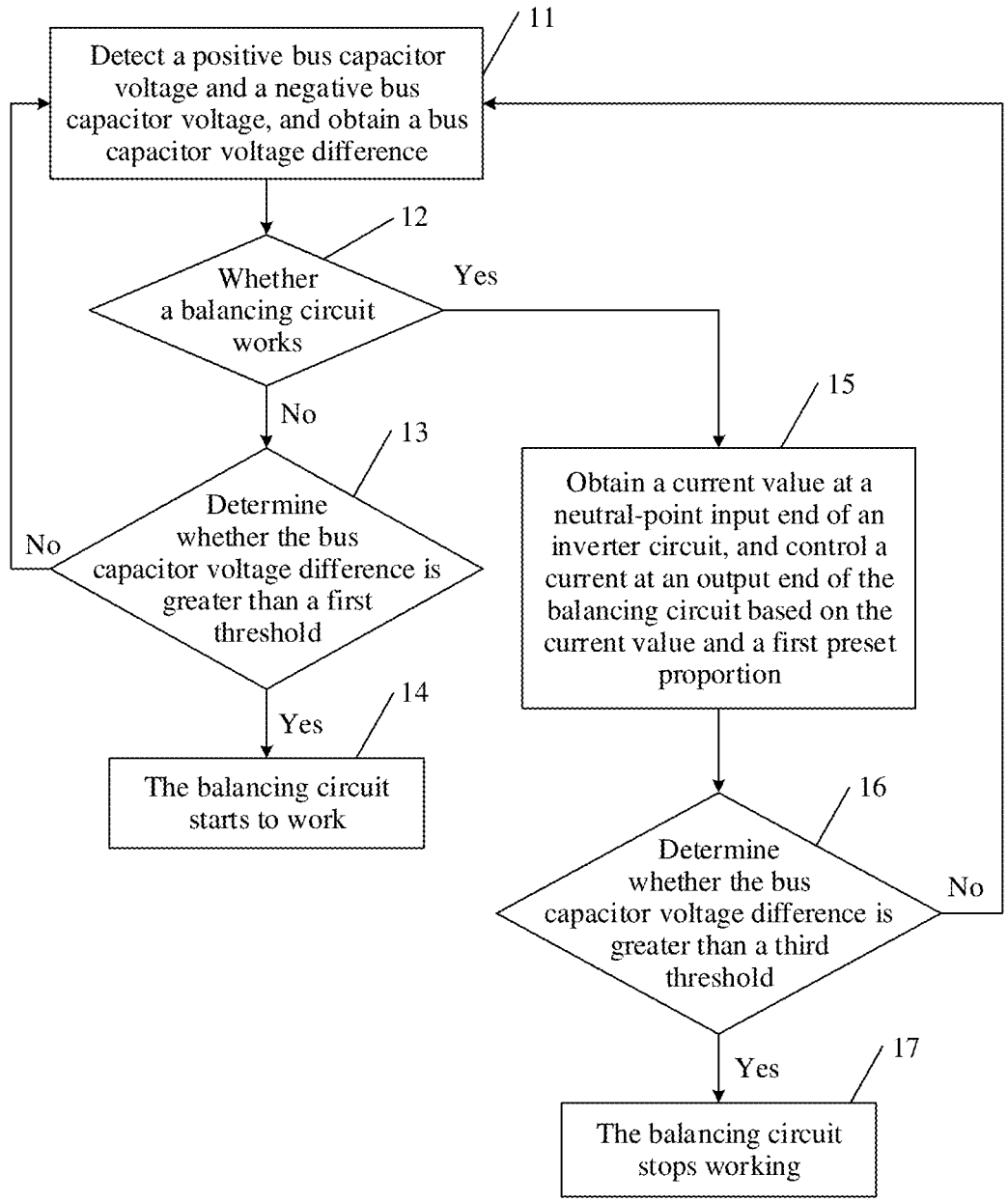
FIG. 12 shows a procedure of controlling a balancing circuit to start to work and not to work.

FIG. 12 shows a procedure of controlling a balancing circuit to work and stop according to the embodiments. A difference between the control procedure in FIG. 12 and the control procedure in FIG. 10 lies in the following: a procedure of controlling the balancing circuit not to work is added on the basis of controlling the balancing circuit to start to work. In the procedure, the balancing circuit may be enabled not to work in a proper case, thereby reducing a loss of the inverter system. As shown in FIG. 12, the procedure of controlling the balancing circuit to work and stop includes the following steps.

Step 11: Detect a positive bus capacitor voltage and a negative bus capacitor voltage, and perform difference calculation to obtain a bus capacitor voltage difference. Step 12 is performed.

Step 12: Determine whether the balancing circuit works. If the balancing circuit works, step 15 is performed; or if the balancing circuit does not work, step 13 is performed.

Step 15: Obtain the current at the neutral-point input end of the inverter circuit, and control, based on a current value and the first preset proportion, the output end of the balancing circuit to output a new balancing current. Step 16 is performed. In this step, a specific control method for controlling the current at the output end of the balancing circuit may be any control method described in FIG. 4 to FIG. 9.

Step 16: Determine whether the bus capacitor voltage difference is less than a third threshold. If the bus capacitor voltage difference is less than the third threshold, step 17 is performed; or if the bus capacitor voltage difference is not less than the third threshold, step 11 is performed. In this step, whether the balancing circuit needs not to work is determined. When the bus capacitor voltage difference is less than the third threshold, that is, after the inverter system participates in balancing adjustment by using the balancing circuit, or a working status of the user local alternating current load changes, and consequently, a bus capacitor voltage fluctuation degree is fully within a bearable range of the bus capacitor, the balancing circuit does not need to additionally provide a balancing capability. When the bus capacitor voltage difference is not less than the third threshold, that is, the bus capacitor voltage difference is large, and does not reach a bus capacitor voltage fluctuation degree at which the balancing circuit stops working, step 11 is performed again. In step 16, whether the balancing circuit needs not to work may alternatively be determined by comparing the current at the neutral-point input end of the inverter circuit with a fourth threshold. That is, if the current at the neutral-point input end of the inverter circuit is less than the fourth threshold, step 17 is performed; or if the current at the middle point input end of the inverter circuit is not less than the fourth threshold, step 11 is performed.

Step 17: The balancing circuit does not work.

Step 13: Determine whether the bus capacitor voltage difference is greater than a first threshold. If the bus capacitor voltage difference is greater than the first threshold, step 14 is performed; or if the bus capacitor voltage difference is not greater than the first threshold, step 11 is performed. The first threshold is greater than the third threshold. In this step, whether the balancing circuit needs to work is determined. When the voltage difference of the bus capacitor is greater than the first threshold, that is, in the inverter system, an unbalanced current required by a user local alternating current load is large, the balancing circuit needs to work to additionally provide a balancing capability. When the bus capacitor voltage difference is not greater than the first threshold, in the inverter system, a balancing capability of the bus capacitor is sufficient and can provide an unbalanced current required by the user local alternating current load, and temporarily, the balancing circuit does not need to work. To ensure that the bus capacitor can work normally, step 11 is performed again, to monitor the bus capacitor voltage difference.

Step 14: The balancing circuit starts to work.

In the foregoing procedure in FIG. 12, whether the balancing circuit needs to work may alternatively be determined by detecting the current at the neutral-point input end of the inverter circuit. Refer to the procedure in FIG. 11.

Figure 13A:
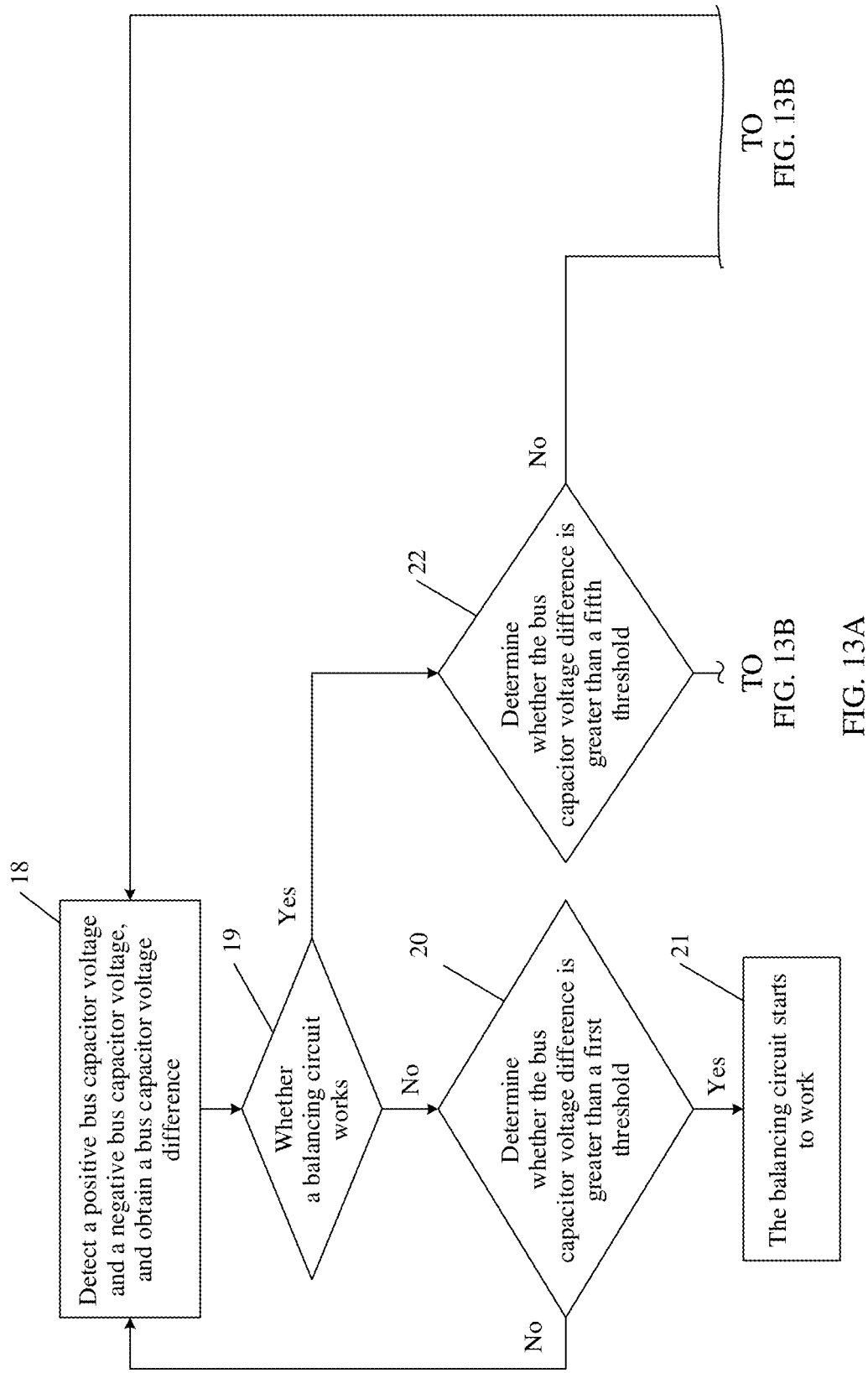
FIG. 13A and FIG. 13B show a procedure for controlling a balancing circuit to adjust a current at an output end.
Figure 13B:
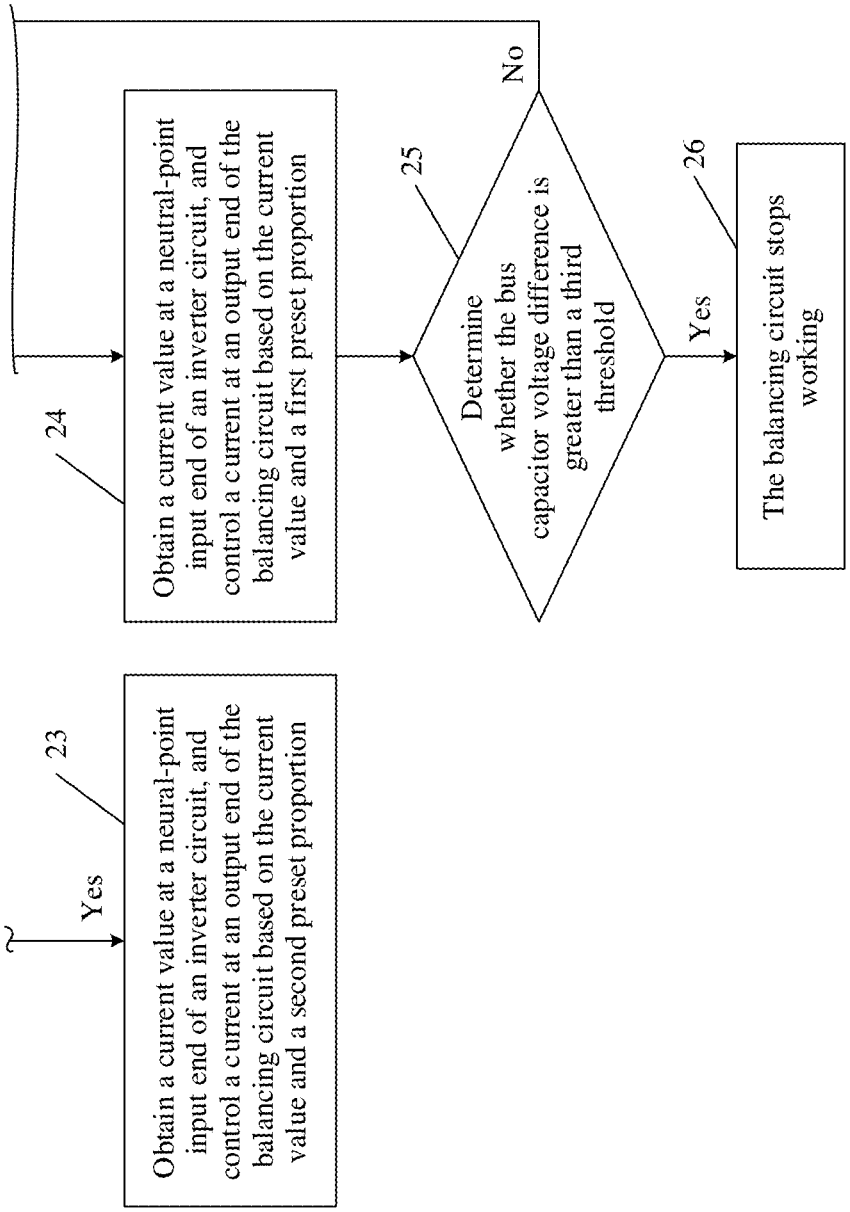

FIG. 13A and FIG. 13B show a procedure for controlling a balancing circuit to adjust an output current according to the embodiments. A difference between the control procedure in FIG. 13A and FIG. 13B and the control procedure in FIG. 12 lies in the following: A function of automatically adjusting the first preset proportion of the balancing circuit is added on a basis of controlling the balancing circuit to start to work and not to work. Based on the function, the first preset proportion may be automatically increased when the balancing circuit works and the bus capacitor voltage difference is still large, so that the balancing circuit outputs different levels of currents in different cases, thereby reducing losses of the inverter system in different cases. As shown in FIG. 13A and FIG. 13B, the procedure of controlling the balancing circuit to work and stop includes the following steps.

Step 18: Detect a positive bus capacitor voltage and a negative bus capacitor voltage, and perform difference calculation to obtain a bus capacitor voltage difference. Step 19 is performed.

Step 19: Determine whether the balancing circuit works. If the balancing circuit works, step 22 is performed; or if the balancing circuit does not work, step 20 is performed.

Step 22: Determine whether the bus capacitor voltage difference is greater than a fifth threshold. If the bus capacitor voltage difference is greater than the fifth threshold, step 23 is performed; or if the bus capacitor voltage difference is not greater than the fifth threshold, step 24 is performed. When the balancing circuit works, in this step, whether the balancing circuit needs to change the first preset proportion in the balancing circuit control method is determined. When the bus capacitor voltage difference is greater than the fifth threshold, that is, the bus capacitor voltage difference is still large after the inverter system participates in balancing adjustment by using the balancing circuit, a current output by the balancing circuit needs to be increased to alleviate voltage fluctuation of the bus capacitor. When the bus capacitor voltage difference is not greater than the fifth threshold, that is, the bus capacitor voltage difference is not large after the inverter system participates in balancing adjustment by using the balancing circuit, the balancing circuit may still work based on the first preset proportion. In step 22, whether the balancing circuit needs to change the first preset proportion in the balancing circuit control method may alternatively be determined by comparing the current at the middle point input end of the inverter circuit with a sixth threshold. That is, if the current at the middle point input end of the inverter circuit is greater than the sixth threshold, step 23 is performed; or if the current at the middle point input end of the inverter circuit is not greater than the sixth threshold, step 24 is performed.

Step 23: Obtain the current at the neutral-point input end of the inverter circuit, and control the current at the output end of the balancing circuit based on a current value and a second preset proportion. The second preset proportion is greater than the first preset proportion. In this step, a specific control method for controlling the current at the output end of the balancing circuit may be any control method described in FIG. 4 to FIG. 9, except that the first preset proportion is increased to the second preset proportion, so that the current at the output end of the balancing circuit can be increased. In this way, voltage fluctuation of the bus capacitor is reduced.

Step 24: Obtain the current at the neutral-point input end of the inverter circuit, and control the current at the output end of the balancing circuit based on a current value and the first preset proportion. Step 25 is performed. In this step, a specific control method for controlling the current at the output end of the balancing circuit may be any control method described in FIG. 4 to FIG. 9.

Step 25: Determine whether the bus capacitor voltage difference is less than a third threshold. The fifth threshold is greater than the third threshold. If the bus capacitor voltage difference is less than the third threshold, step 26 is performed; or if the bus capacitor voltage difference is not less than the third threshold, step 18 is performed. In this step, whether the balancing circuit needs not to work is determined. When the bus capacitor voltage difference is less than the third threshold, that is, after the inverter system participates in balancing adjustment by using the balancing circuit, or a working status of the user local alternating current load changes, and consequently, a bus capacitor voltage fluctuation degree is fully within a bearable range of the bus capacitor, the balancing circuit does not need to additionally provide a balancing capability. When the bus capacitor voltage difference is not less than the third threshold, that is, the bus capacitor voltage difference is large, and does not reach a bus capacitor voltage fluctuation degree at which the balancing circuit stops working, step 18 is performed again.

Step 26: The balancing circuit does not work.

Step 20: Determine whether the bus capacitor voltage difference is greater than a first threshold. If the bus capacitor voltage difference is greater than the first threshold, step 21 is performed; or if the bus capacitor voltage difference is not greater than the first threshold, step 18 is performed. The first threshold is greater than the third threshold. In this step, whether the balancing circuit needs to work is determined. When the voltage difference of the bus capacitor is greater than the first threshold, that is, in the inverter system, an unbalanced current required by a user local alternating current load is large, the balancing circuit needs to work to additionally provide a balancing capability. When the bus capacitor voltage difference is not greater than the first threshold, in the inverter system, a balancing capability of the bus capacitor is sufficient and can provide an unbalanced current required by the user local alternating current load, and temporarily, the balancing circuit does not need to work. To ensure that the bus capacitor can work normally, step 18 is performed again, to monitor the bus capacitor voltage difference.

Step 21: The balancing circuit starts to work.

In the foregoing procedure in FIG. 13A and FIG. 13B, whether the balancing circuit needs to work may alternatively be determined by detecting the current at the neutral-point input end of the inverter circuit. Refer to the procedure in FIG. 11.

It should be noted that, the terms "first" and "second" are used for descriptive purposes only, and cannot be construed as indicating or implying relative importance.

The foregoing described unit division is merely logical function division and may be another division in an actual implementation. For example, a plurality of units or components may be combined or integrated into another system, or some features may be ignored or not performed. In addition, connections between the displayed or discussed components may be implemented through some interfaces. Indirect couplings or communication connections between devices or units may be implemented in electronic, mechanical, or other forms.

The foregoing descriptions are merely implementations of the embodiments, but are not intended to limit their scope. Any variation or replacement readily figured out by a person skilled in the art within the scope of the embodiments shall fall within their scope.

What is claimed is:

1. An inverter, comprising:
an inverter circuit, positive and negative direct current buses, a bus capacitor, a balancing circuit, and a controller, wherein the inverter circuit, the bus capacitor, and the balancing circuit are each connected to the positive and negative direct current buses; wherein
input of the inverter circuit comprises a positive input end, a negative input end, and a neutral-point input end, the positive input end and the negative input end of the inverter circuit are respectively connected to the positive and negative direct current buses, output of the inverter circuit comprises a three-phase output end and a neutral-point output end or a two-phase output end and a neutral-point output end, and the output of the inverter circuit is configured to connect to a user load; and
the bus capacitor is configured to reduce voltage fluctuation of the inverter circuit to ensure that the inverter works normally, and the bus capacitor comprises a positive bus capacitor and a negative bus capacitor, wherein the positive bus capacitor and the negative bus capacitor are connected in series between the positive and negative direct current buses, and a neutral-point end of the positive bus capacitor and a neutral-point end of the negative bus capacitor are connected to the neutral-point input end of the inverter circuit; and
the balancing circuit comprises a positive input end, a negative input end, and an output end, wherein the positive input end and the negative input end of the balancing circuit are respectively connected to the positive and negative direct current buses, and the output end of the balancing circuit is connected to the neutral-point input end of the inverter circuit; and
the controller is configured to control the balancing circuit based on a current $i_{neu}$ at the neutral-point input end of the inverter circuit, so that the output end of the balancing circuit outputs a balancing current $i_{ban}$, and a current output at the neutral-point end of the bus capacitor is $i_{cn}$, wherein $0<i_{ban}<i_{neu}$, and $0<i_{tn}<i_{neu}$.

2. The inverter according to claim 1, wherein the controller is further configured to:

control the balancing circuit based on the current $i_{neu}$ at the neutral-point input end of the inverter circuit, so that the output end of the balancing circuit outputs the balancing current $i_{ban}$, and $i_{ban}=K*i_{neu}$ is satisfied on a low-frequency component or on an effective value of a low-frequency component, wherein K is a first preset proportion, and K is greater than 0 and less than 1.

3. The inverter according to claim 1, wherein the controller is further configured to:

control the balancing circuit based on the current $i_{neu}$ at the neutral-point input end of the inverter circuit, so that the output end of the balancing circuit outputs the balancing current $i_{ban}$, and $i_{ban}=K*i_{neu\_fund}+i_{neu\_other}$ is satisfied on a low-frequency component, wherein $i_{neu\_fund}$ is a fundamental component of $i_{neu}$, $i_{neu\_other}$ is a harmonic component of $i_{neu}$, K is a first preset proportion, and K is greater than 0 and less than 1.

4. The inverter according to claim 2, wherein, on the low-frequency component, a superposition of the balancing current $i_{ban}$ output by the output end of the balancing circuit and the current $i_{cn}$ output at the neutral-point end of the bus capacitor is equal to the current $i_{neu}$ at the neutral-point input end of the inverter circuit.

5. The inverter according to claim 1, wherein the balancing circuit comprises at least two switching transistors and a filter inductor, the at least two switching transistors are connected in series between the positive and negative direct current buses, one end of the filter inductor is connected to neutral points of the at least two switching transistors, and the other end of the filter inductor is connected to the neutral-point end of the bus capacitor; and the controller is further configured to control, based on the current $i_{neu}$ at the neutral-point input end of the inverter circuit, turn-on and turn-off of the at least two switching transistors of the balancing circuit, to adjust the balancing current $i_{ban}$ output at the output end of the balancing circuit.

6. The inverter according to claim 5, wherein the controller is further configured to: obtain a reference value $i_{ref}$ of $i_{ban}$ based on the current $i_{neu}$ at the neutral-point input end of the inverter circuit and the first preset proportion K; and then output a control signal based on the reference value $i_{ref}$, to control the balancing circuit to output the balancing current $i_{ban}$, and adjust the balancing current $i_{ban}$ to be consistent with the reference value $i_{ref}$.

7. The inverter according to claim 1, wherein the inverter circuit is a T-type, neutral-point-clamped, or active neutral-point-clamped three-level three-phase inverter circuit; the three-level three-phase inverter circuit comprises three groups of three-level switching transistor bridge arms and three groups of LC filters; positive ends and negative ends of the three groups of three-level switching transistor bridge arms are respectively connected to the positive and negative direct current buses; neutral-point input ends of the three groups of three-level switching transistor bridge arms are connected to each other; input ends of the three groups of LC filters are respectively connected to output ends of the three groups of three-level switching transistor bridge arms, and output ends of the three groups of LC filters are configured to connect to the user load; and the neutral-point input end of the inverter circuit is configured to connect to an N wire end of the user load.

8. The inverter according to claim 1, wherein the inverter circuit is a Heric inverter circuit; the Heric inverter circuit comprises two groups of vertical-bridge switching transistor bridge arms, one group of horizontal-bridge switching transistor bridge arms, and two groups of LC filters; and positive ends and negative ends of the two groups of vertical-bridge switching transistor bridge arms are respectively connected to the positive and negative direct current buses; neutral-point ends of the two groups of vertical-bridge switching transistor bridge arms are connected to each other by using the horizontal-bridge switching transistor bridge arms; input ends of the two groups of LC filters are respectively connected to the neutral-point ends of the two groups of vertical-bridge switching transistor bridge arms; output ends of the two groups of LC filters are configured to connect to the user load; and the neutral-point end of the inverter circuit is configured to connect to an N wire end of the user load.

9. The inverter according to claim 7, wherein a filter capacitor neutral point of the LC filter in the inverter circuit is electrically connected to the neutral-point input end of the inverter circuit, to reduce a common mode current flowing into the user load; or a filter capacitor neutral point of the LC filter in the inverter circuit is electrically disconnected from the neutral-point input end of the inverter circuit, to adjust a common mode current of the user load.

10. The inverter according to claim 1, wherein a current at a neutral-point input end of the inverter circuit is obtained by using a sampling circuit; or a current at a neutral-point input end of the inverter circuit is obtained through calculation by using a current at the input end of the inverter circuit or a current at the output end of the inverter circuit.

11. A method, applied to a power generation system, wherein the power generation system comprises an inverter circuit, positive and negative direct current buses, a bus capacitor, and a balancing circuit, and the inverter circuit, the bus capacitor, and the balancing circuit are all connected to the positive and negative direct current buses, the method comprising:

obtaining a current $i_{neu}$ at a neutral-point input end of the inverter circuit, wherein the neutral-point input end of the inverter circuit is connected to a neutral-point end of the bus capacitor, and the neutral-point input end of the inverter circuit is connected to an output end of the balancing circuit; and controlling the balancing circuit based on the current $i_{neu}$ at the neutral-point input end of the inverter circuit, so that the output end of the balancing circuit outputs a balancing current $i_{ban}$, and a current output at the neutral-point end of the bus capacitor is $i_{cn}$, wherein $0<i_{ban}<i_{neu}$, and $0<i_{cn}<i_{neu}$.

12. The method according to claim 11, wherein controlling the balancing circuit based on the current $i_{neu}$ at the neutral-point input end of the inverter circuit, so that the output end of the balancing circuit outputs a balancing current $i_{ban}$, comprises:

controlling the balancing circuit based on the current $i_{neu}$ at the neutral-point input end of the inverter circuit, so that the output end of the balancing circuit outputs the balancing current $i_{ban}$, and $i_{ban}=K*i_{neu}$ is satisfied on a low-frequency component or on an effective value of a low-frequency component, wherein K is a first preset proportion, and K is greater than 0 and less than 1.

13. The method according to claim 11, wherein controlling the balancing circuit based on the current $i_{neu}$ at the neutral-point input end of the inverter circuit, so that the output end of the balancing circuit outputs a balancing current $i_{ban}$, comprises:
controlling the balancing circuit based on the current $i_{neu}$ at the neutral-point input end of the inverter circuit, so that the output end of the balancing circuit outputs the balancing current $i_{ban}$, and $i_{ban}=K*i_{neu\_fund}+i_{neu\_other}$ is satisfied on a low-frequency component, wherein $i_{neu\_fund}$ is a fundamental component of $i_{neu}$, $i_{neu\_other}$ is a harmonic component of $i_{neu}$, K is a first preset proportion, and K is greater than 0 and less than 1.

14. The method according to claim 11, wherein controlling the balancing circuit based on the current $i_{neu}$ at the neutral-point input end of the inverter circuit, so that the output end of the balancing circuit outputs a balancing current $i_{ban}$, and a current at the neutral-point end of the bus capacitor is $i_{cn}$, comprises:
obtaining a bus capacitor voltage difference, wherein the bus capacitor voltage difference is a difference between a positive bus capacitor voltage and a negative bus capacitor voltage; and
when the balancing circuit does not work, comparing the bus capacitor voltage difference with a first threshold, and when the bus capacitor voltage difference is greater than the first threshold, controlling the balancing circuit to work.

15. The method according to claim 11, wherein controlling the balancing circuit based on the current $i_{neu}$ at the neutral-point input end of the inverter circuit, so that the output end of the balancing circuit outputs a balancing current $i_{ban}$, and a current output at the neutral-point end of the bus capacitor is $i_{cn}$, comprises:
when the balancing circuit does not work, comparing $i_{neu}$ with a second threshold, and when $i_{neu}$ is greater than the second threshold, controlling the balancing circuit to work.

16. The method according to claim 14, wherein controlling the balancing circuit, so that the output end of the balancing circuit outputs a balancing current $i_{ban}$, comprises:
when the balancing circuit works, controlling the balancing circuit based on the current $i_{neu}$ at the neutral-point input end of the inverter circuit, so that the output end of the balancing circuit outputs the balancing current $i_{ban}$, and the current output at the neutral-point end of the bus capacitor is $i_{cn}$.

17. The method according to claim 16, wherein controlling the balancing circuit based on the current $i_{neu}$ at the neutral-point input end of the inverter circuit, so that the output end of the balancing circuit outputs a balancing current $i_{ban}$, and a current output at the neutral-point end of the bus capacitor is $i_{cn}$, comprises:
obtaining a bus capacitor voltage difference, wherein the bus capacitor voltage difference is a difference between a positive bus capacitor voltage and a negative bus capacitor voltage; and
comparing the bus capacitor voltage difference with a third threshold, and when the bus capacitor voltage difference is less than the third threshold, controlling the balancing circuit not to work.

18. The method according to claim 16, wherein controlling the balancing circuit based on the current $i_{neu}$ at the neutral-point input end of the inverter circuit, so that the output end of the balancing circuit outputs a balancing current $i_{ban}$, and a current output at the neutral-point end of the bus capacitor is $i_{cn}$, comprises:
comparing $i_{neu}$ with a fourth threshold, and when $i_{neu}$ is less than the fourth threshold, controlling the balancing circuit not to work.

19. The method according to claim 16, wherein controlling the balancing circuit, so that the output end of the balancing circuit outputs a balancing current $i_{ban}$, comprises:
obtaining a bus capacitor voltage difference, wherein the bus capacitor voltage difference is a difference between a positive bus capacitor voltage and a negative bus capacitor voltage; and
comparing the bus capacitor voltage difference with a fifth threshold, when the bus capacitor voltage difference is greater than the fifth threshold, adjusting the first preset proportion K to a second preset proportion K", wherein K<K"<1, and controlling the balancing circuit based on the current $i_{neu}$ at the neutral-point input end of the inverter circuit, so that the output end of the balancing circuit outputs the balancing current $i_{ban}$, and the current output at the neutral-point end of the bus capacitor is $i_{cn}$.

20. The method according to claim 16, the controlling the balancing circuit, so that the output end of the balancing circuit outputs a balancing current $i_{ban}$, comprises:
comparing $i_{neu}$ with a sixth threshold, and when $i_{neu}$ is greater than the sixth threshold, adjusting the first preset proportion K to a second preset proportion K', wherein K<K'<1, and controlling the balancing circuit based on the current $i_{neu}$ at the neutral-point input end of the inverter circuit, so that the output end of the balancing circuit outputs the balancing current $i_{ban}$, and the current output at the neutral-point end of the bus capacitor is $i_{cn}$.

* * * * *